(12) United States Patent
Kojima et al.

(10) Patent No.: US 11,134,198 B2
(45) Date of Patent: Sep. 28, 2021

(54) IMAGING APPARATUS

(71) Applicant: Panasonic Intellectual Property Management Co., Ltd., Osaka (JP)

(72) Inventors: Hiroyuki Kojima, Osaka (JP); Kyosuke Osuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 106 days.

(21) Appl. No.: 16/808,673

(22) Filed: Mar. 4, 2020

(65) Prior Publication Data

US 2020/0288062 A1    Sep. 10, 2020

(30) Foreign Application Priority Data

Mar. 5, 2019 (JP) .............................. JP2019-039732

(51) Int. Cl.
*H04N 5/232* (2006.01)
*G03B 17/02* (2021.01)

(52) U.S. Cl.
CPC ......... *H04N 5/23287* (2013.01); *G03B 17/02* (2013.01); *G03B 2217/005* (2013.01)

(58) Field of Classification Search
None
See application file for complete search history.

(56) References Cited

U.S. PATENT DOCUMENTS

| | | | | |
|---|---|---|---|---|
| 6,122,446 A | * | 9/2000 | Satoh | .................... G02B 27/646 396/52 |
| 9,131,122 B2 | * | 9/2015 | Oya | .................. G08B 13/19691 |
| 2016/0112627 A1 | * | 4/2016 | Ono | .................. H04N 5/232935 382/255 |
| 2017/0078577 A1 | | 3/2017 | Wakamatsu | |
| 2017/0200472 A1 | * | 7/2017 | Munukutla | .......... G11B 27/005 |
| 2017/0251146 A1 | * | 8/2017 | Ikeda | ................. H04N 5/23267 |
| 2019/0052810 A1 | * | 2/2019 | Tsubaki | ............ H04N 5/23258 |

FOREIGN PATENT DOCUMENTS

| | | |
|---|---|---|
| JP | 2010-21614 A | 1/2010 |
| JP | 2014-050081 A | 3/2014 |
| JP | 2017-058660 A | 3/2017 |
| JP | 2017-146362 A | 8/2017 |

OTHER PUBLICATIONS

European Search Report Application No. 20160911.2 dated May 18, 2020.

* cited by examiner

*Primary Examiner* — Cynthia Segura

(74) *Attorney, Agent, or Firm* — Renner, Otto, Boisselle & Sklar, LLP

(57) ABSTRACT

An imaging apparatus according to the present disclosure includes an imaging sensor that captures an object image formed through an interchangeable lens, to generate image data, a driver that performs image blur correction by moving the imaging sensor in a plane perpendicular to an optical axis, an operation unit that accepts a user operation for changing a movable amount of the imaging sensor during image blur correction, and a controller that causes the driver to move the imaging sensor within a range of a changed movable amount.

9 Claims, 24 Drawing Sheets

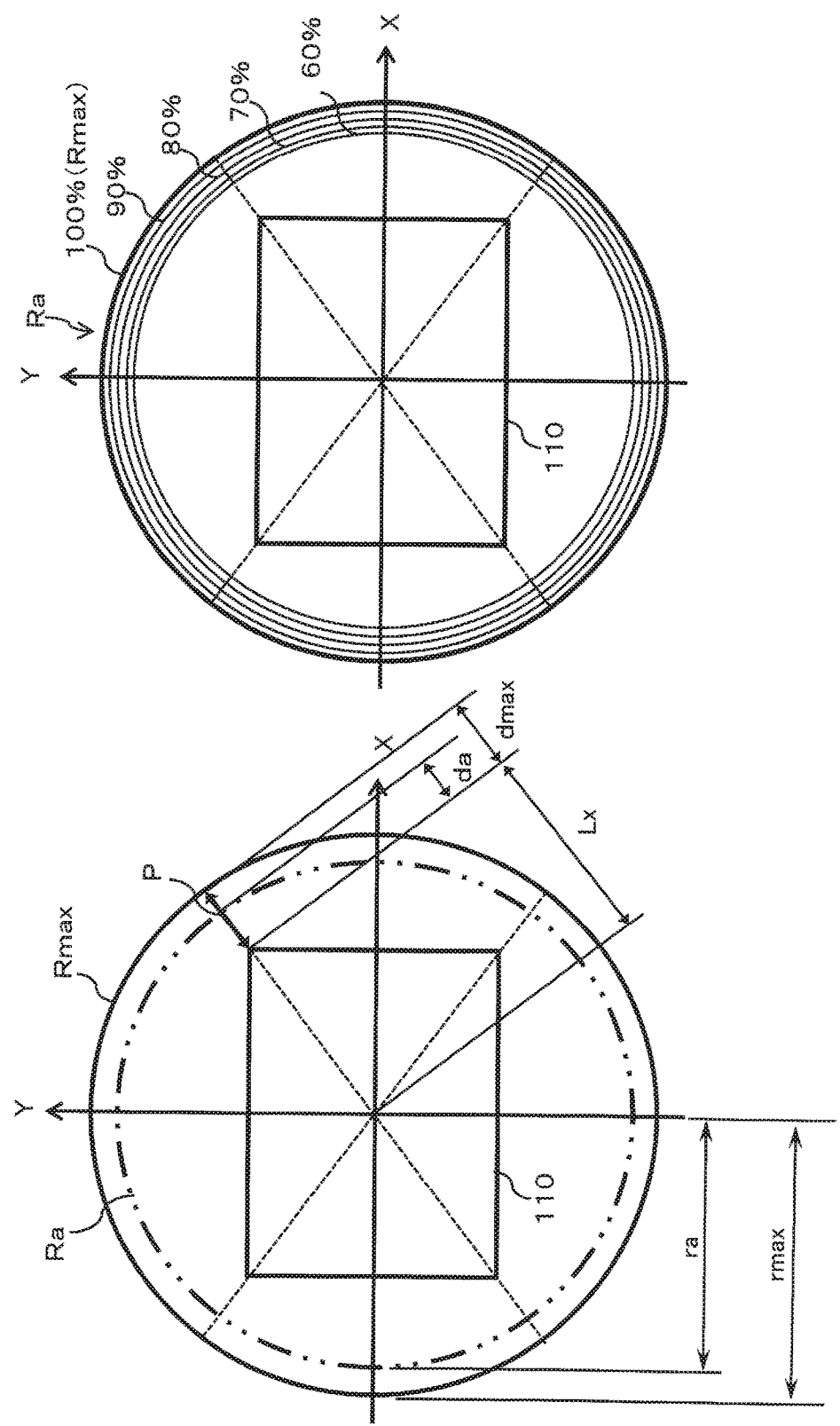

| LENS MODEL NUMBER | SETTING VALUE OF CORRECTION RANGE SETTING |
|---|---|
| AB1-50 | 90% |
| CX-35 | 80% |
| WX-100 | 90% |

Fig. 18

| LENS MODEL NUMBER | SETTING VALUE OF CORRECTION RANGE SETTING |
|---|---|
| W-100 | 90% |
| AB1-50 | 90% |
| B-200 | 80% |
| CX-35 | 80% |
| S-14 | 90% |
| WX-100 | 90% |
| ... | ... |

Fig.22A
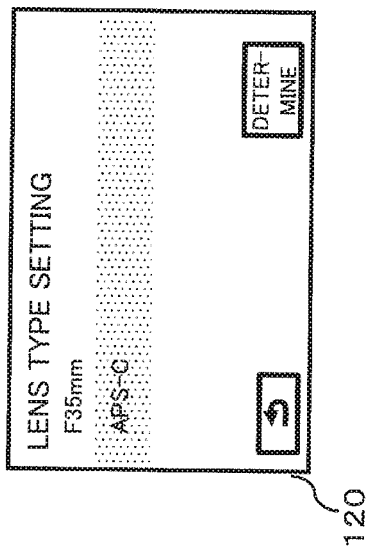
Fig.22B
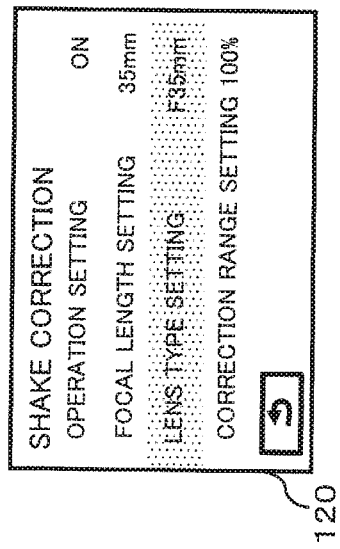
Fig.22C
Fig.22D
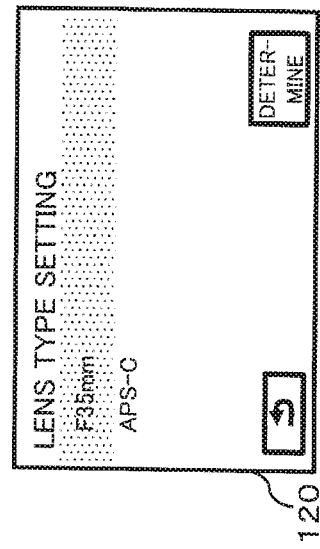

IMAGING APPARATUS

TECHNICAL FIELD

The present disclosure relates to an imaging apparatus having a shake correction function.

BACKGROUND ART

JP 2017-146362 A discloses a digital camera that performs shake correction (image blur correction) by moving an imaging sensor in a plane perpendicular to an optical axis.

SUMMARY

In the case that an interchangeable lens, so-called an old lens, is attached to an imaging apparatus, a vignetting may occur in a captured image due to insufficiency of a size of an image circle of the interchangeable lens, when an imaging sensor is moved in a plane perpendicular to an optical axis for image blur correction.

An object of the present disclosure is to suppress occurrence of vignetting in a captured image in a lens interchangeable imaging apparatus.

An imaging apparatus according to the present disclosure includes an imaging sensor that captures an object image formed through an interchangeable lens, to generate image data, a driver that performs image blur correction by moving the imaging sensor in a plane perpendicular to an optical axis, an operation unit that accepts a user operation for changing a movable amount of the imaging sensor during image blur correction, and a controller that causes the driver to move the imaging sensor within a range of a changed movable amount.

According to the present disclosure, a movable amount of the imaging sensor during image blur correction can be changed by a user operation. Therefore, the imaging sensor can be driven within an image circle of the interchangeable lens. This can suppress occurrence of vignetting in the captured image.

BRIEF DESCRIPTION OF DRAWINGS

FIGS. 5A and 5B are views illustrating a movable range of an imaging sensor;

FIG. 16 is a view showing an example of a list of correction range setting data;

FIG. 18 is a view illustrating an example of a master data list;

FIGS. 22A to 22D are views illustrating the lens type setting process;

DESCRIPTION OF EMBODIMENTS

Hereinafter, embodiments of the present disclosure will be described with reference to the drawings as appropriate. However, in the detailed description, unnecessary portions in the description regarding a related art and substantially the same configuration may be omitted. This is to simplify the description. Further, the following description and the accompanying drawings are disclosed to enable those skilled in the art to fully understand the present disclosure, and are not intended to limit the subject matter of the claims. Hereinafter, a digital camera will be described as an example of an imaging apparatus.

First Embodiment

A digital camera of the present embodiment has a shake correction function that reduces an influence of camera shake on a captured image, in each of an interchangeable lens and a camera body. Hereinafter, a configuration and an operation of the camera of the present embodiment will be described in detail. Note that, in the following description, a function of correcting shake by shifting a correction lens in the interchangeable lens is referred to as "optical image stabilizer (OIS) function". The function of correcting shake by shifting the imaging sensor (imaging element) in the camera body is referred to as "body image stabilizer (BIS) function".

1. Configuration

Figure 1:
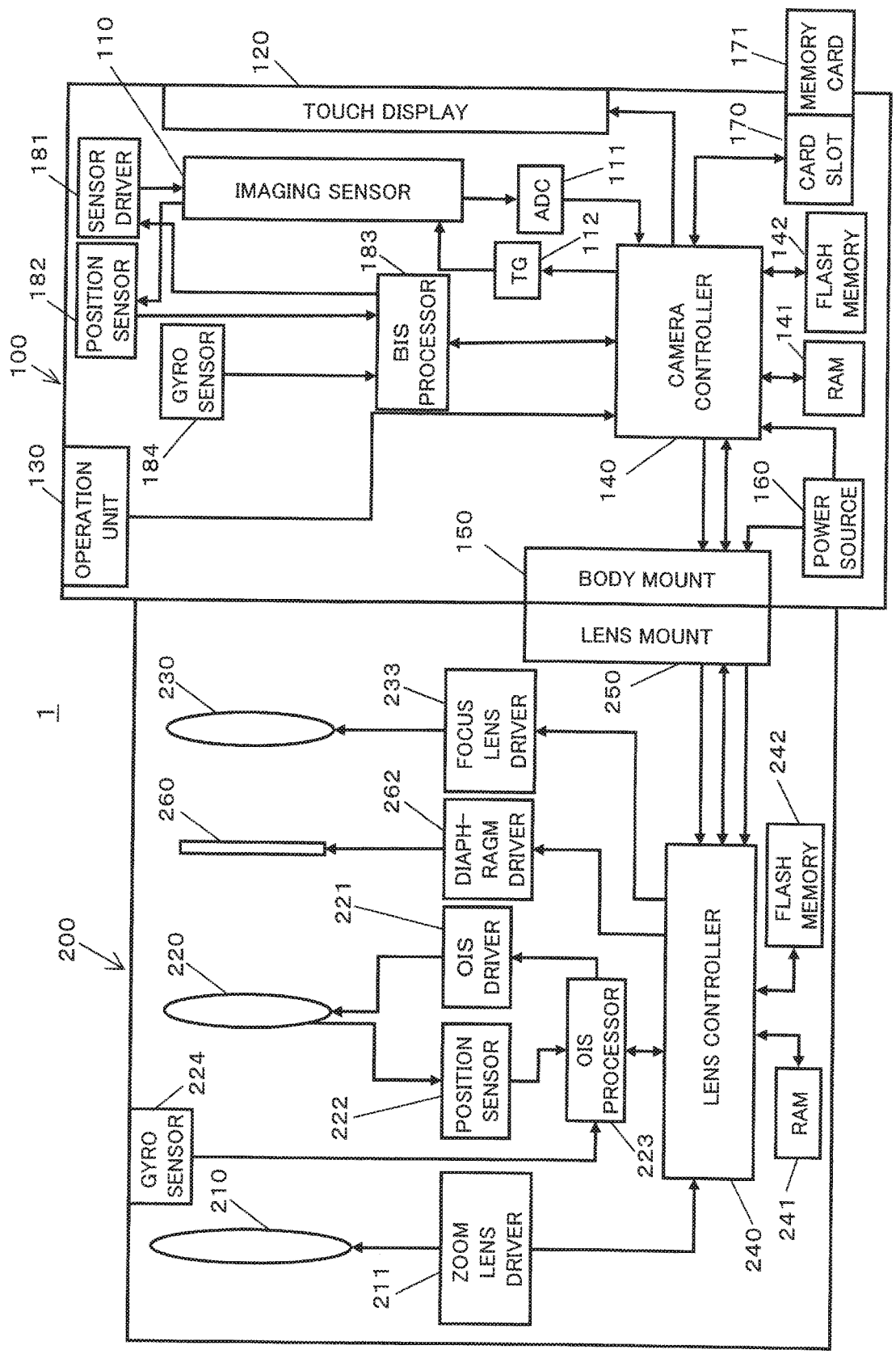
FIG. 1 is a block diagram showing a configuration of a digital camera of a first embodiment.

FIG. 1 is a block diagram showing a configuration of a digital camera according to a first embodiment. The digital camera 1 includes a camera body 100, and an interchangeable lens 200 that can be mounted to the camera body 100.

1-1. Camera Body

The camera body 100 (an example of an imaging apparatus) includes an imaging sensor 110, a touch display 120, an operation unit 130, a camera controller 140, a body mount 150, a power source 160, and a card slot 170.

The camera controller 140 controls the entire operation of the digital camera 1 by controlling a component such as the imaging sensor 110, in accordance with an instruction from a release button. The camera controller 140 transmits a vertical synchronization signal to a timing generator 112. In parallel with this, the camera controller 140 generates an exposure synchronization signal. The camera controller 140 periodically transmits the generated exposure synchronization signal to a lens controller 240 through the body mount 150 and a lens mount 250. The camera controller 140 uses a DRAM 141 as a work memory during a control operation and an image processing operation. The camera controller 140 is an example of a controller.

The imaging sensor 110 is an element that captures an object image incident through the interchangeable lens 200, to generate image data. The imaging sensor 110 is, for example, a CCD, a CMOS imaging sensor, or an NMOS imaging sensor. The generated image data is digitized by an AD converter 111. The digitized image data is subjected to inversion processing in vertical and horizontal directions and other predetermined image processing by the camera controller 140. Other predetermined image processing includes, for example, gamma correction processing, white balance correction processing, flaw correction processing, YC conversion processing, electronic zoom processing, and JPEG compression processing.

The imaging sensor 110 operates at timing controlled by the timing generator 112. The imaging sensor 110 generates a still image or moving image for recording, or a live view image. The live view image is mainly a moving image and is displayed on the touch display 120 so that the user determines a composition for capturing a still image.

The touch display 120 displays various kinds of information including an image such as a live view image, and a menu screen. The touch display 120 can be configured using, for example, a liquid crystal display device or an organic EL display device. The touch display 120 is also a pointing device having a touch operation detection function and can accept a touch operation by a user. The touch operation detection function may be embedded integrally to a liquid crystal display device or an organic EL display device or may be configured with a touch sensor panel that is a separate member from these display devices. The touch display 120 is an example of a display unit and an operation unit and configures a graphic user interface that accepts user operations based on images.

Figure 2:
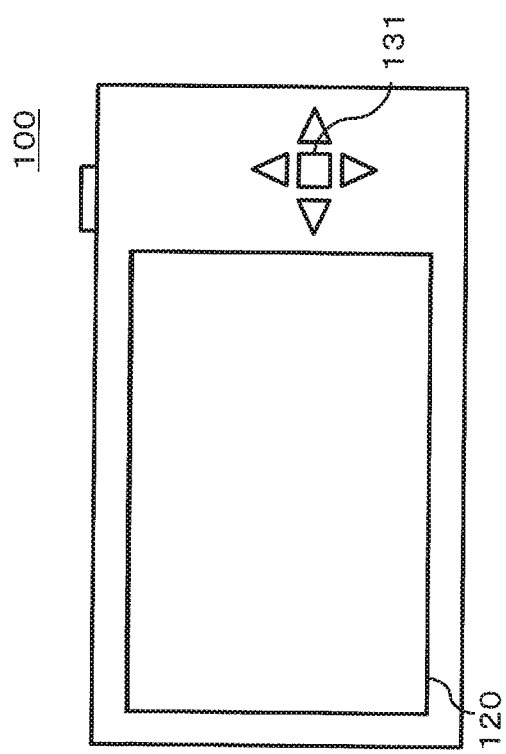
FIG. 2 is a rear view of the digital camera.

The operation unit 130 includes various operation members such as a release button for instructing start of capturing, a mode dial for setting a capturing mode, and a power switch. Further, as shown in FIG. 2, the operation unit 130 includes a joystick 131 that accepts a tilting operation in up, down, left, and right directions by the user. The joystick 131 outputs a signal indicating a tilted direction among the up, down, left, and right directions.

A flash memory 142 stores data necessary for the camera controller 140 to perform a control operation.

The card slot 170 can be loaded with a memory card 171 and controls the memory card 171 based on control from the camera controller 140. The digital camera 1 can store image data in the memory card 171 and can read image data from the memory card 171.

The power source 160 is a circuit that includes a secondary battery and supplies power to each element in the digital camera 1.

The body mount 150 can be mechanically and electrically connected to the lens mount 250 of the interchangeable lens 200. The body mount 150 can transmit and receive data between with the interchangeable lens 200 through the lens mount 250. The body mount 150 transmits an exposure synchronization signal received from the camera controller 140, to the lens controller 240 through the lens mount 250. Further, other control signals received from the camera controller 140 are transmitted to the lens controller 240 through the lens mount 250. In addition, the body mount 150 transmits a signal received from the lens controller 240 through the lens mount 250, to the camera controller 140. Further, the body mount 150 supplies power from the power source 160 to the entire interchangeable lens 200 through the lens mount 250.

In addition, as a configuration to realize a BIS function (a function of correcting camera shake by shifting the imaging sensor 110), the camera body 100 further includes a gyro sensor 184 (shake detection unit) that detects shake of the camera body 100, and a BIS processor 183 that controls a shake correction process based on a detection result of the gyro sensor 184. Furthermore, the camera body 100 includes a sensor driver 181 that moves the imaging sensor 110, and a position sensor 182 that detects a position of the imaging sensor 110.

The sensor driver 181 can be realized by a magnet and a flat coil, for example. The position sensor 182 is a sensor that detects a position of the imaging sensor 110 in a plane perpendicular to an optical axis of an optical system. The position sensor 182 can be realized by a magnet and a Hall element, for example. The sensor driver 181 is an example of a driver.

The BIS processor 183 controls the sensor driver 181 to shift the imaging sensor 110 in a plane perpendicular to the optical axis to cancel image blur of an object image caused by shake of the camera body 100, based on a signal from the gyro sensor 184 and a signal from the position sensor 182.

1-2. Interchangeable Lens

The interchangeable lens 200 includes an optical system, the lens controller 240, and the lens mount 250. The optical system includes a zoom lens 210, an optical image stabilizer (OIS) lens 220, a focus lens 230, and a diaphragm 260.

The zoom lens 210 is a lens to change magnification of an object image formed by the optical system. The zoom lens 210 includes one or a plurality of lenses. The zoom lens 210 is driven by a zoom lens driver 211. The zoom lens driver 211 includes a zoom ring that can be operated by the user. Alternatively, the zoom lens driver 211 may include a zoom lever and an actuator or a motor. The zoom lens driver 211 moves the zoom lens 210 along an optical axis direction of the optical system in accordance with an operation by the user.

The focus lens 230 is a lens to change a focus state of an object image that is formed on the CMOS imaging sensor 110 by the optical system. The focus lens 230 includes one or a plurality of lenses. The focus lens 230 is driven by a focus lens driver 233.

The focus lens driver 233 includes an actuator or a motor and moves the focus lens 230 along the optical axis of the optical system based on control of the lens controller 240. The focus lens driver 233 can be realized by a DC motor, a stepping motor, a servo motor, an ultrasonic motor, or the like.

The OIS lens 220 is a lens to correct blur of an object image formed by the optical system of the interchangeable lens 200, in an OIS function (a function of correcting camera shake by shifting the OIS lens 220). The OIS lens 220 moves in a direction for canceling shake of the digital camera 1, thereby reducing blur of the object image on the imaging sensor 110. The OIS lens 220 includes one or a plurality of lenses. The OIS lens 220 is driven by an OIS driver 221.

The OIS driver 221 shifts the OIS lens 220 within a plane perpendicular to an optical axis of the optical system, in response to control of an OIS processor 223. A range in which the OIS lens 220 can be driven by the OIS driver 221 is mechanically limited. The range in which the OIS lens 220 can be mechanically driven by the OIS driver 221 is referred to as "OIS lens movable range". The OIS driver 221 can be realized by a magnet and a flat coil, for example. A position sensor 222 is a sensor that detects a position of the OIS lens 220 in a plane perpendicular to an optical axis of an optical system. The position sensor 222 can be realized by a magnet and a Hall element, for example. The OIS processor 223 controls the OIS driver 221 based on an output of the position sensor 222 and an output of a gyro sensor 224 (shake detector).

The diaphragm 260 adjusts an amount of light incident on the imaging sensor 110. The diaphragm 260 is driven by a diaphragm driver 262, to control a size of an opening. The diaphragm driver 262 includes a motor or an actuator.

The gyro sensor 184 or 224 detects shake (vibration) in a yawing direction and a pitching direction based on a change in angle per unit time of the digital camera 1, that is, an angular velocity. The gyro sensor 184 or 224 outputs an angular velocity signal indicating a detected shake amount (angular velocity) to the BIS processor 183 or the OIS processor 223. The angular velocity signal outputted by the gyro sensor 184 or 224 may include a wide range of frequency components due to camera shake or mechanical noise. Instead of the gyro sensor, another sensor capable of detecting shake of the digital camera 1 can also be used.

The camera controller 140 and the lens controller 240 may be configured with a hard-wired electronic circuit or a microcomputer using a program. For example, the camera controller 140 and the lens controller 240 can be realized by a processor such as a CPU, an MPU, a GPU, a DSU, an FPGA, or an ASIC.

1-3. BIS Processor

Figure 3:
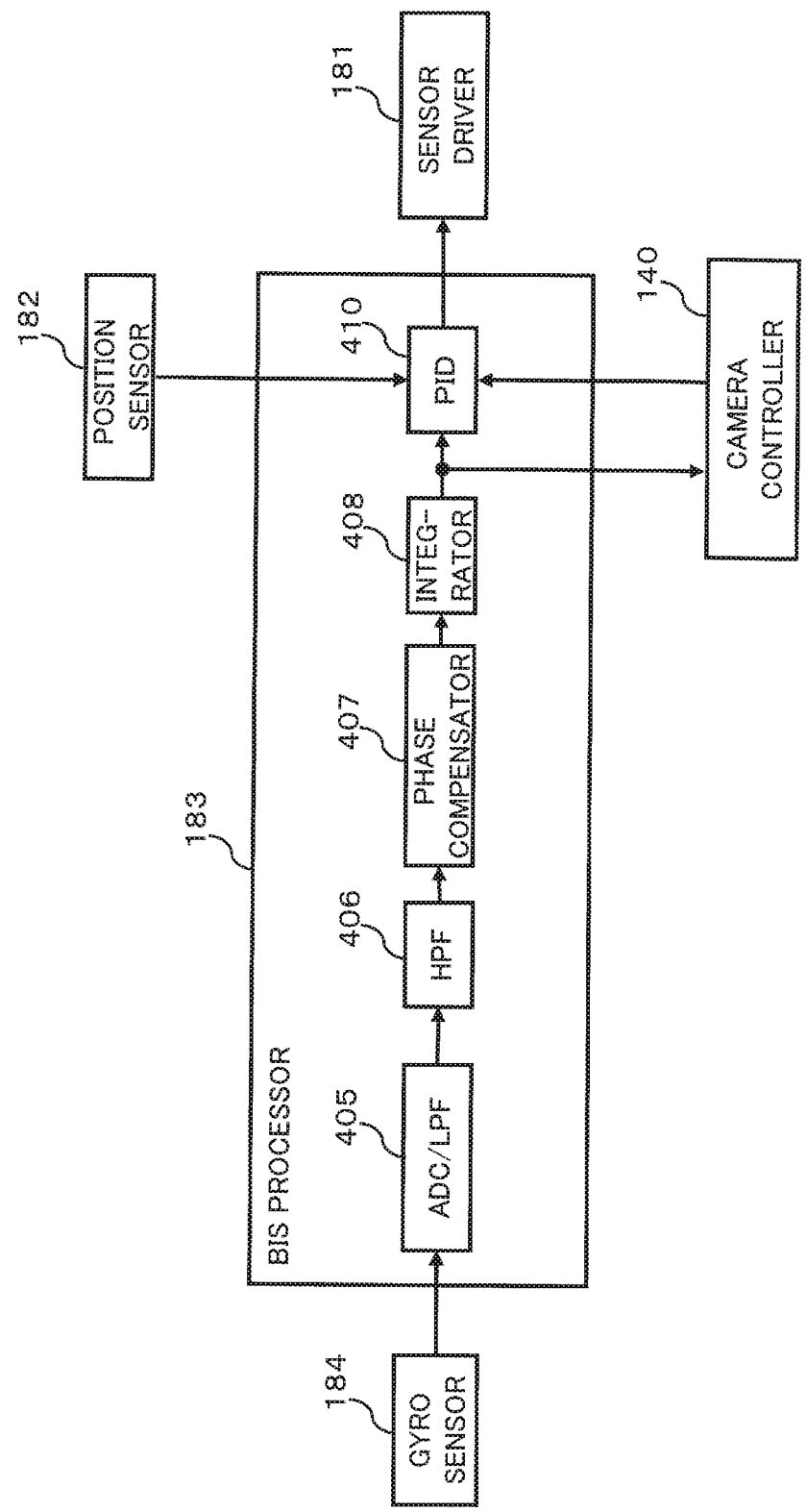
FIG. 3 is a block diagram showing a configuration of a BIS processor in the digital camera.

A configuration of the BIS processor 183 in the camera body 100 will be described with reference to FIG. 3. The BIS processor 183 includes an analog/digital conversion unit (ADC)/low pass filter (LPF) 405, a high pass filter (HPF) 406, a phase compensator 407, an integrator 408, and a PID controller 410.

The ADC/LPF 405 converts an angular velocity signal from the gyro sensor 184 from an analog format to a digital format. Further, the ADC/LPF 405 blocks a high-frequency component of the angular velocity signal converted into the digital format, in order to eliminate noise and exclusively extract shake of the digital camera 1. A photographer's camera shake frequency is a low frequency of about 1 to 10 Hz, and a cutoff frequency of the LPF is set in consideration of this point. The function of the LPF can be omitted if noise is not a problem.

The HPF 406 blocks a predetermined low frequency component included in a signal received from the ADC/LPF 405, in order to block a drift component.

The phase compensator 407 corrects phase delay caused by the sensor driver 181 and the like, with respect to a signal received from the HPF 406.

The integrator 408 integrates a signal indicating an angular velocity of shake (vibration) inputted from the phase compensator 407, to generate a signal (hereinafter, referred to as "shake detection signal") indicating an angle of the shake (vibration). The shake detection signal from the integrator 408 is inputted to the PID controller 410.

The PID controller 410 generates a drive signal for shifting the imaging sensor 110 based on a signal from the position sensor 182, a signal from the integrator 408, and a control signal from the camera controller 140, and outputs the drive signal to the sensor driver 181. The sensor driver 181 drives the imaging sensor 110 based on the drive signal. The control signal from the camera controller 140 stores, for example, information on a limited movable range Ra of the imaging sensor 110 (described later). The PID controller 410 generates the drive signal based on the information on the limited movable range Ra so that the imaging sensor 110 is not driven to deviate out of the limited movable range Ra.

1-4. OIS Processor

Figure 4:
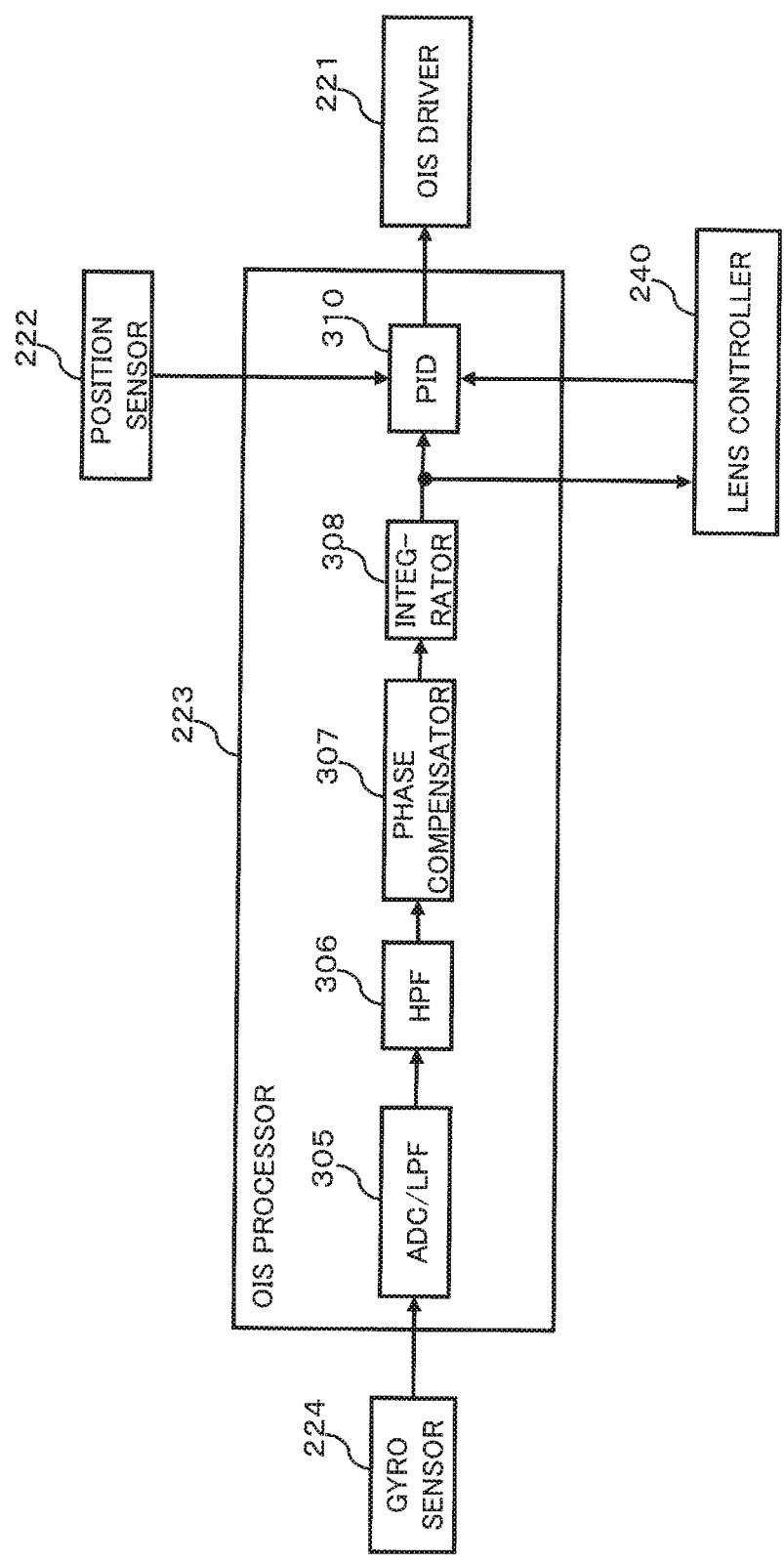
FIG. 4 is a block diagram showing a configuration of an OIS processor in the digital camera.

A configuration of the OIS processor 223 in the interchangeable lens 200 will be described with reference to FIG. 4. The OIS processor 223 includes an analog/digital conversion (ADC)/low pass filter (LPF) 305, a high pass filter (HPF) 306, a phase compensator 307, an integrator 308, and a PID controller 310.

The ADC/LPF 305 converts an angular velocity signal from the gyro sensor 224 from an analog format to a digital format. Further, the ADC/LPF 305 blocks a high-frequency component of the angular velocity signal converted into the digital format, in order to eliminate noise and exclusively extract shake of the digital camera 1. A photographer's camera shake frequency is a low frequency of about 1 to 10 Hz, and a cutoff frequency of the LPF is set in consideration of this point. The function of the LPF can be omitted if noise is not a problem.

The HPF 306 blocks a predetermined low frequency component included in a signal received from the ADC/LPF 305, in order to block a drift component.

The phase compensator 307 corrects phase delay caused by the OIS driver 221, the lens-body communication, and the like, with respect to the signal received from the HPF 306.

The integrator 308 integrates a signal indicating an angular velocity of shake (vibration) inputted from the phase compensator 307, to generate a shake detection signal indicating an angle of the shake (vibration). The shake detection signal from the integrator 308 is inputted to the PID controller 310.

The PID controller 310, generates a drive signal for shifting the OIS lens 220 based on a signal from the position sensor 222, a signal from the integrator 308, and a control signal from the camera controller 140, and outputs the drive signal to the OIS driver 221. The OIS driver 221 drives the OIS lens 220 based on the drive signal.

2. Operation

Hereinafter, an operation of the digital camera 1 configured as described above will be described.

The BIS processor 183 of the camera body 100 generates a drive signal for driving the imaging sensor 110 based on a detection signal from the gyro sensor 184 and position information from the position sensor 182, to transmit the drive signal to the sensor driver 181. The sensor driver 181 shifts the imaging sensor 110 on a plane perpendicular to an optical axis to cancel shake detected by the gyro sensor 184, in accordance with the drive signal from the BIS processor 183.

The OIS processor 223 of the interchangeable lens 200 generates a drive signal for driving the OIS lens 220 based on a detection signal from the gyro sensor 224 and position information from the position sensor 222, to transmit the drive signal to the OIS driver 221. In accordance with the drive signal, the OIS driver 221 shifts the OIS lens 220 on a plane perpendicular to the optical axis to cancel shake detected by the gyro sensor 224.

For shake correction, either one of the OIS function and the BIS function may be activated, or both may be activated simultaneously.

As described above, the digital camera 1 reduces an influence of camera shake in a captured image by activating the shake correction function based on a detected shake signal.

FIGS. 5A and 5B are views illustrating a movable range of the imaging sensor 110. FIG. 5A shows a positional relationship between the imaging sensor 110 and a movable range when the imaging sensor 110 is not driven. When the imaging sensor 110 is not driven, a center of the imaging sensor 110 (a center of an imaging surface) is located at an intersection of an X axis and a Y axis, as shown in FIG. 5A. The position of the imaging sensor 110 at this time is referred to as "sensor reference position". An X-axis direction is a direction parallel to a width direction of the imaging sensor 110. A Y-axis direction is a direction parallel to a height direction of the imaging sensor 110. In FIG. 5A, a diagonal length between the center of the imaging sensor 110 and a corner of the imaging sensor 110 is indicated by Lx.

The sensor driver 181 can move the imaging sensor 110 within a maximum movable range Rmax. The maximum movable range Rmax is a maximum range in which the sensor driver 181 can drive the imaging sensor 110, and is determined by a mechanical structure of the sensor driver 181. In FIG. 5A, a radius of the maximum movable range Rmax is indicated by rmax. A distance in a radial direction between a corner of the imaging sensor 110 at the sensor reference position and an outer circumference circle of the maximum movable range Rmax is indicated by dmax. The distance dmax corresponds to a maximum distance (maximum movement distance) in which the sensor driver 181 can mechanically move the imaging sensor 110 in a diagonal direction. Hereinafter, the distance dmax is referred to as "maximum movable amount dmax" as appropriate. The radius rmax of the maximum movable range Rmax has a size obtained by adding the maximum movable amount dmax to a diagonal length Lx of the imaging sensor 110.

A movable range of the imaging sensor 110 can be limited to a range smaller than the maximum movable range Rmax by outputting an instruction signal (information) for limiting the movable range to the PID controller 410 from the camera controller 140. The movable range thus limited is hereinafter referred to as "limited movable range Ra" as appropriate. In FIG. 5A, a radius of the limited movable range Ra is indicated by ra. A distance in a radial direction between the corner of the imaging sensor 110 at the sensor reference position and an outer circumference circle of the limited movable range Ra is indicated by da. Hereinafter, the distance da is appropriately referred to as "limited movable amount da". The radius ra of the limited movable range Ra has a size obtained by adding the limited movable amount da to the diagonal length Lx of the imaging sensor 110. A ratio (%) of the limited movable amount da to the maximum movable amount dmax is hereinafter referred to as "movable amount limitation rate" as appropriate.

FIG. 5B shows a positional relationship between the imaging sensor 110 and the limited movable range Ra when the imaging sensor 110 is not driven. FIG. 5B shows, as an example, the limited movable range Ra when the movable amount limitation rate is 100%, 90%, 80%, 70%, and 60%. As is apparent from FIG. 5B, the radius of the limited movable range Ra becomes smaller as the movable amount limitation rate becomes smaller. Note that the movable amount limitation rate can take an appropriate value other than 100%, 90%, 80%, 70%, and 60%.

The camera body 100 communicates with the interchangeable lens 200 to acquire information regarding an image circle C of the interchangeable lens 200 (hereinafter, appropriately referred to as "image circle information"), and limits a movement of the imaging sensor 110 of the interchangeable lens 200 so that the imaging sensor 110 does not deviate out of the image circle C during shake correction. Here, the image circle is a circular light irradiation range which is formed by light passing through a lens on a plane perpendicular to an optical axis of the lens (interchangeable lens), and has, for example, luminance and lens performance of a certain ratio or more with respect to a center of the lens. The image circle information is information indicating a size (for example, radius) of the image circle C.

Note that, for example, the camera body 100 acquires the image circle information of the interchangeable lens 200 as follows. For example, image circle information is stored in the flash memory 242 of the interchangeable lens 200. The camera controller 140 of the camera body 100 communicates with the lens controller 240 of the interchangeable lens 200 to acquire information stored in the flash memory 242. Note that the image circle information may be stored in the flash memory 142 of the camera body 100 in association with model information of the interchangeable lens 200. In this case, the camera controller 140 communicates with the interchangeable lens 200, acquires the model information from the interchangeable lens 200, for example, and acquires image circle information corresponding to the acquired model information from the flash memory 142.

Figure 6A:
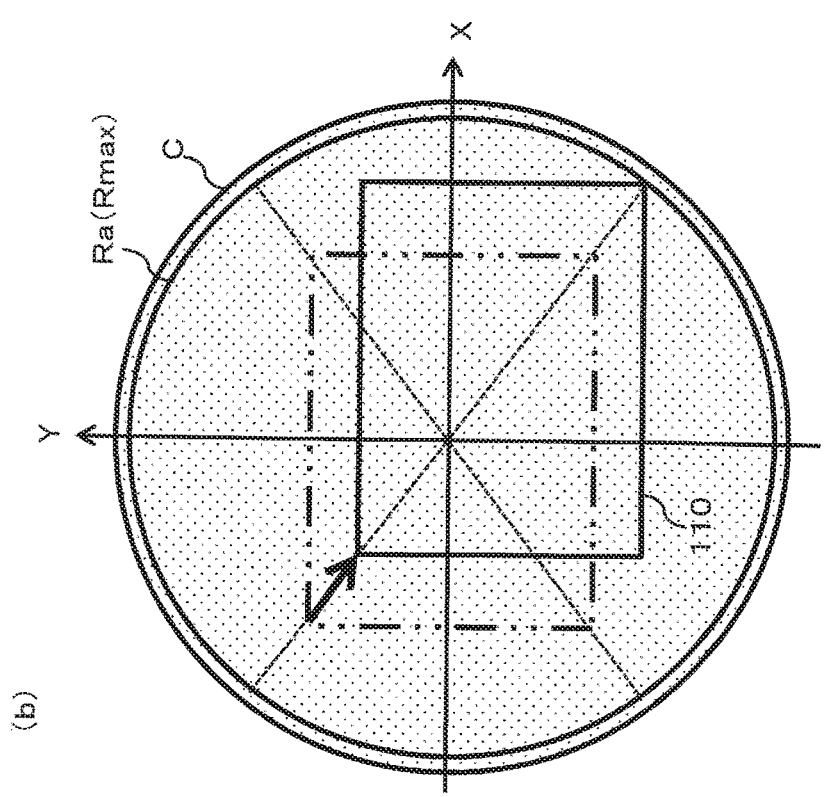
FIGS. 6A and 6B are views illustrating a relative positional relationship between the imaging sensor and an image circle.
Figure 6B:
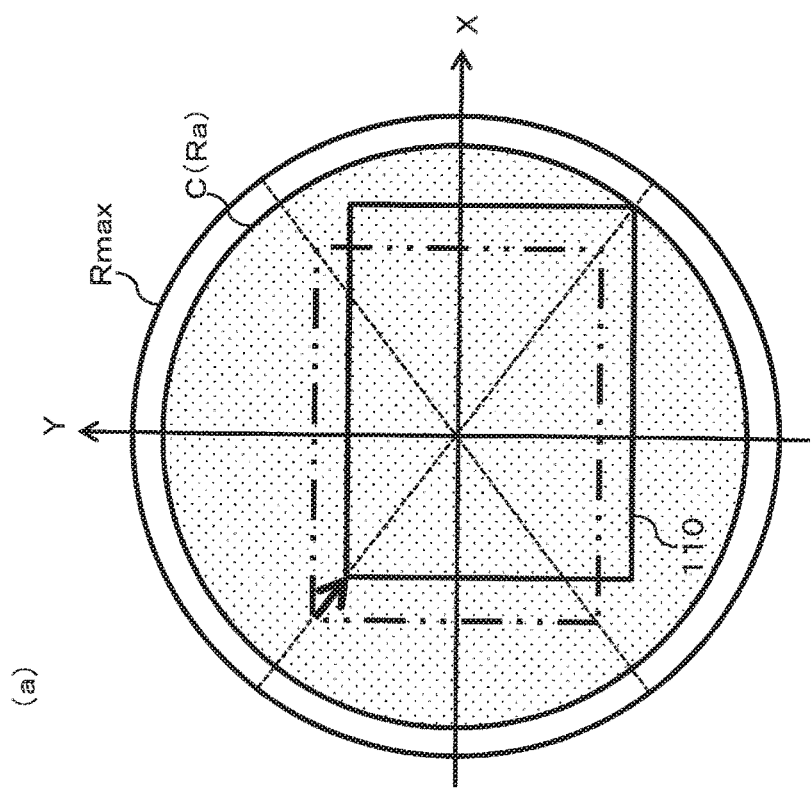

FIGS. 6A and 6B are views illustrating a relative positional relationship between the imaging sensor 110 and an image circle. FIGS. 6A and 6B show a relative positional relationship between the imaging sensor 110 and the image circle C when the BIS function is activated for shake correction. As shown in FIG. 6A, when the image circle C is smaller than the maximum movable range Rmax, the camera controller 140 limits a movable amount of the imaging sensor 110 during shake correction to an amount smaller than the maximum movable amount Lmax. With this, as shown in FIG. 6A, a movable range of the imaging sensor 110 is limited to a partial range in the maximum movable range Rmax (limited movable range Ra). Then, the camera controller 140 causes the sensor driver 181 to drive the imaging sensor 110 within the limited movable range Ra. FIG. 6A shows an example in which the limited movable range Ra has the same size (radius) as the image circle C, but the size (radius) of the limited movable range Ra is merely required to be equal to or less than the size (radius) of the image circle C. On the other hand, as shown in FIG. 6B, when the size (radius) of the image circle C indicated by the image circle information is larger than the maximum movable range Rmax, the camera controller 140 sets, as the limited movable range Ra, a range having the same size as the maximum movable range Rmax without limiting the movable range of the imaging sensor 110. Then, the camera controller 140 causes the sensor driver 181 to drive the imaging sensor 110 within the maximum movable range Rmax (the limited movable range Ra). By setting the movable range of the imaging sensor 110 in accordance with the magnitude relationship between the size (radius) of the image circle C and the size (radius) of the maximum movable range Rmax in this way, it is possible to inhibit that the imaging sensor 110 deviates from the image circle C during shake correction regardless the size of the image circle C. Therefore, occurrence of vignetting due to deviation of the imaging sensor 110 from the image circle C can be suppressed.

Note that the camera body 100 acquires the image circle information of the interchangeable lens 200 as follows. For example, image circle information is stored in the flash memory 242 of the interchangeable lens 200. The camera controller 140 communicates with the lens controller 240 of the interchangeable lens 200 to acquire information stored in the flash memory 242. Note that the image circle information may be stored in the flash memory 142 of the camera body 100 in association with model information of the interchangeable lens 200. In this case, the camera controller 140 communicates with the interchangeable lens 200, acquires the model information from the interchangeable lens 200, and acquires image circle information corresponding to the acquired model information from the flash memory 142.

Here, depending on specifications of the interchangeable lens used in combination with the camera body 100, the camera body 100 may not be able to communicate with the interchangeable lens to acquire image circle information. This type of interchangeable lens includes, for example, an interchangeable lens designed for a film camera. Further, even if the camera body 100 and the interchangeable lens can communicate, the camera body 100 may not be able to acquire image circle information. This type of lens includes, for example, an interchangeable lens incapable of communication due to a difference in communication standards even if a mount type is the same. Hereinafter, an interchangeable lens incapable of acquiring image circle information when attached to the camera body 100 is appropriately referred to as an "old lens". When such an old lens is attached to the camera body 100, the camera body 100 is not able to acquire image circle information, and thus, cannot perform the above-described control for setting the limited movable range Ra based on the image circle information. In this case, the following problems may occur.

Figure 7:
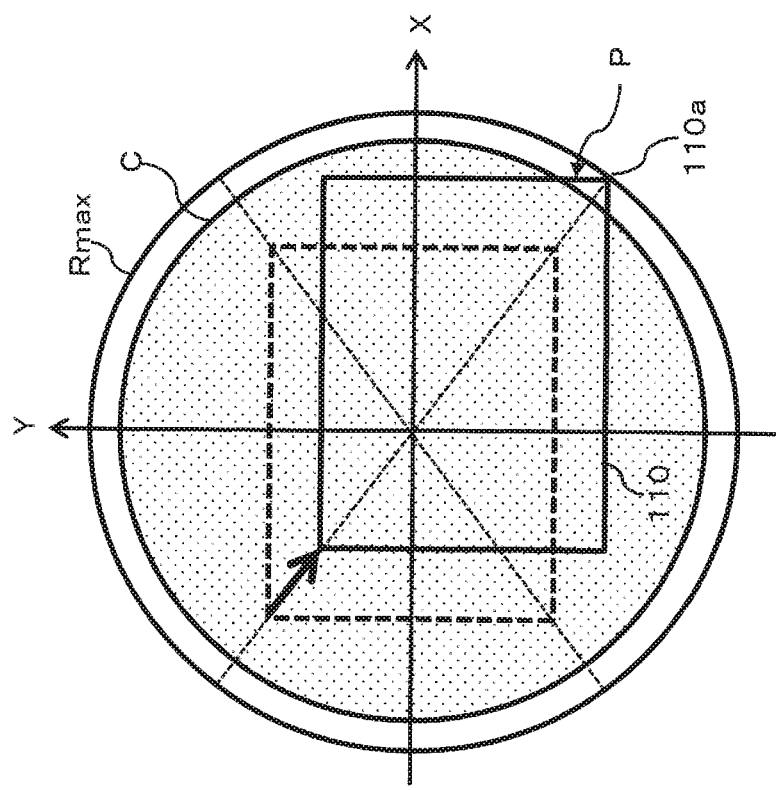
FIG. 7 is a view illustrating a relative positional relationship between the imaging sensor and the image circle when an old lens is attached.

FIG. 7 is a view illustrating a relative positional relationship between an imaging sensor and an image circle of an old lens. FIG. 7 shows a relative positional relationship between the imaging sensor 110 and the image circle C when the BIS function is activated for shake correction. As shown in FIG. 7, the image circle C of the old lens may be smaller than the maximum movable range Rmax. When such an old lens is attached to the camera body 100, the camera body 100 is not able to acquire image circle information of the old lens. Therefore, it is not possible to limit the movable amount of the imaging sensor 110 to set the limited movable range Ra. Consequently, the imaging sensor 110 may deviate out of the image circle C as indicated by an arrow P in FIG. 7. In FIG. 7, a lower right corner 110a of the imaging sensor 110 deviates out of the image circle C, and object light does not reach a deviating portion near the lower right corner 110a in the imaging sensor 110. Therefore, vignetting occurs in the captured image. Conventionally, a user needs to choose whether to use the BIS function while knowing that vignetting may occur, or to turn off the BIS function.

In view of such a problem, the camera body 100 according to the present embodiment provides an imaging apparatus that can drive an imaging sensor in an image circle of an interchangeable lens, even when it is not possible to acquire information on the size of the image circle of the interchangeable lens. A configuration and an operation for realizing this will be described below.

2.1 Shake Correction Process in Digital Camera

In the camera body 100 of the present embodiment, a size of the limited movable range Ra of the imaging sensor 110 can be set (changed) based on a user operation when the camera body 100 is not able to acquire image circle information of the interchangeable lens. Specifically, in a correction range setting screen of FIG. 8, the user selects one setting value from "100%", "90%", "80%", "70%", and "60%" as a setting value of the correction range setting, as a result, the size of the limited movable range Ra can be changed to a size corresponding to the setting value as shown in FIG. 5B described above. In this example, the "movable amount limitation rate", which is a ratio (%) of the limited movable amount da to the maximum movable amount dmax described above, is used as the setting value of the correction range setting. The movable amount limitation rate being 100% means that the limited movable range Ra and the maximum movable range Rmax have a same size (radius), and a movable amount of the imaging sensor 110 is not limited, that is, the imaging sensor 110 can be driven within the maximum movable range Rmax.

2.2 Correction Range Setting Screen

Figure 8:
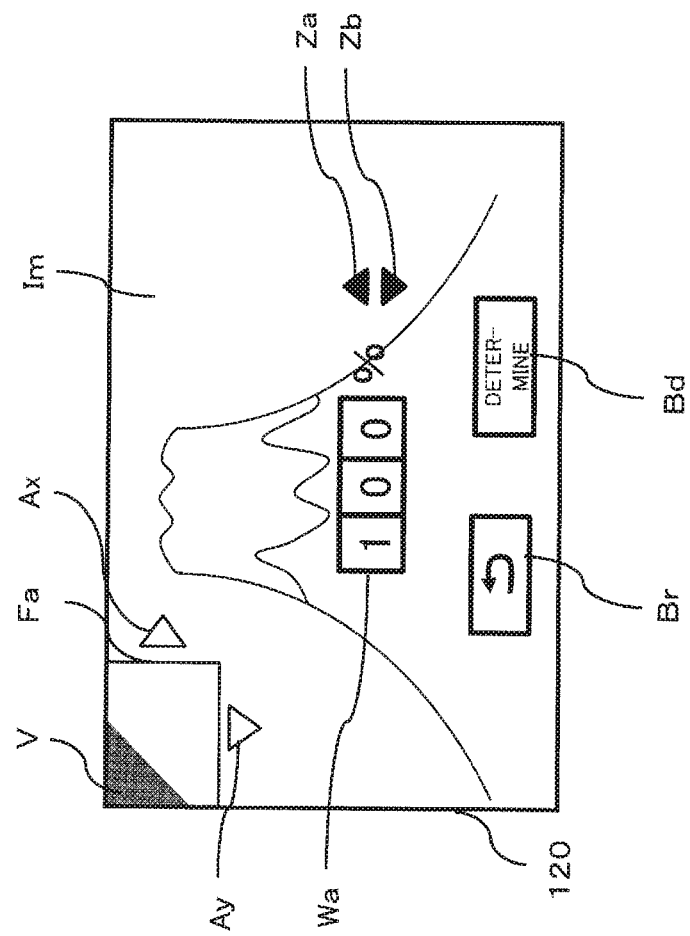
FIG. 8 is a view showing an example of a correction range setting screen.

The correction range setting screen in FIG. 8 will be described in more detail. On the correction range setting screen, a live view image Im is displayed as a background image. The correction range setting screen of FIG. 8 shows an example in which the live view image Im is an image on which Mt. Fuji and the surrounding sky are photographed.

Further, the correction range setting screen displays a numerical window Wa, a determination button Bd, a return button Br, a gaze frame Fa, an X-direction cursor Ax, a Y-direction cursor Ay, an upward cursor Za, and a downward cursor Zb, to be superimposed on the live view image Im.

The numerical window Wa is a window to display a setting value of the correction range setting.

The determination button Bd is a button to accept a determination operation by the user regarding the setting content on the correction range setting screen.

The return button Br is a button to accept a return operation by the user to a menu screen shown in FIG. 13A described later.

The gaze frame Fa is a frame that surrounds a region where vignetting may occur in the live view image on the correction range setting screen, which is a region (gaze region) at which the user should gaze.

The upward cursor Za and the downward cursor Zb are buttons to accept a setting value change operation in the numerical window Wa. Touching the upward cursor Za can increase the setting value. Touching the downward cursor Zb can decrease the setting value.

The numerical window Wa will be described in more detail. The numerical window Wa displays a numerical value indicating a movable amount limitation rate as a setting value. FIG. 8 shows an example in which "100%" is set as the movable amount limitation rate. The numerical value indicating the movable amount limitation rate can be changed by the touch operation by the user to the upward cursor Za or the downward cursor Zb. In this example, the user can selectively set from "100%", "90%", "80%", "70%", and "60%" by touching the upward cursor Za and the downward cursor Zb. Note that the movable amount limitation rate may be changed in increments of 1%.

The correction range setting screen of FIG. 8 shows, a screen as an example when the imaging sensor 110 is moved maximally to the lower right in the diagonal direction within the limited movable range Ra (maximum movable range Rmax) when the movable amount limitation rate is "100%".

Further, an example is shown in which a size (radius) of the limited movable range Ra (maximum movable range Rmax) when the movable amount limitation rate is 100% is larger than a size (radius) of the image circle C. In this case, the lower right corner 110a of the imaging sensor 110 deviates out of the image circle C. Therefore, object light does not reach the vicinity of the lower right corner 110a of the imaging sensor 110 that deviates out of the image circle C. Consequently, vignetting V occurs in an upper left corner of the live view image Im which is the background image of the correction range setting screen in FIG. 8. The user can recognize that the vignetting V is to occur in the upper left corner of the captured image when the movable amount limitation rate is set to 100%, by viewing the image in the gaze frame Fa in the live view image Im. In addition, the user can recognize that the movable amount limitation rate is required to be changed to a value smaller than 100% in order not to cause vignetting V. In this case, the user may simply touch the downward cursor Zb to change the value of the movable amount limitation rate.

When the user tilts the joystick 131 in the direction indicated by the X-direction cursor Ax or the Y-direction cursor Ay, the gaze frame Fa can be moved in the tilted direction.

FIGS. 9A to 9D are views illustrating a movement of the gaze frame Fa in the correction range setting screen. In the digital camera 1, tilting the joystick 131 can move the gaze frame Fa to an upper left corner (FIG. 9A), to an upper right corner (FIG. 9B), to a lower left corner (FIG. 9C), and to a lower right corner (FIG. 9D), on the correction range setting screen. Note that each view of FIG. 9 shows a case where the setting values are all 100%, but this is an example.

When the gaze frame Fa is moved by the user, the camera controller 140 moves the imaging sensor 110 in accordance with the movement of the gaze frame Fa as illustrated in FIGS. 10A to 10D.

Figure 9A:
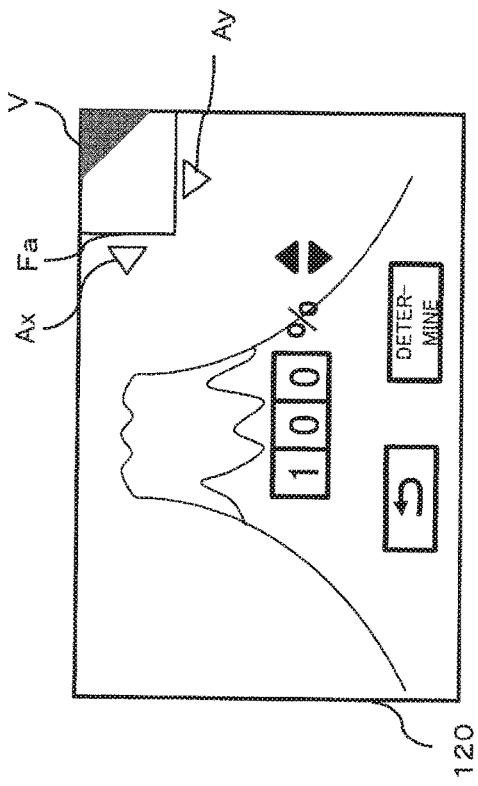
FIGS. 9A to 9D are views illustrating a movement of a gaze frame in the correction range setting screen.
Figure 9B:
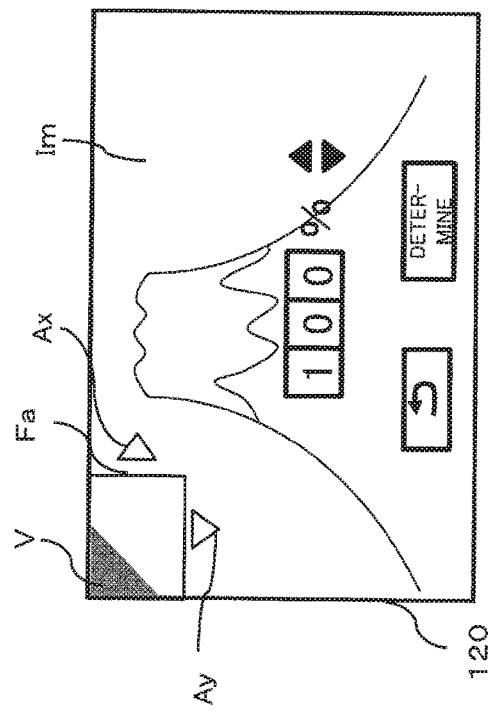
Figure 9C:
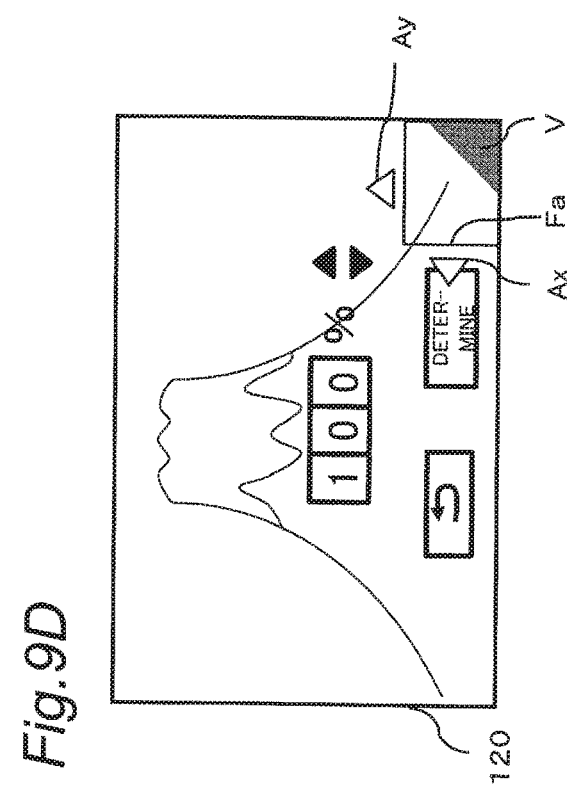
Figure 9D:
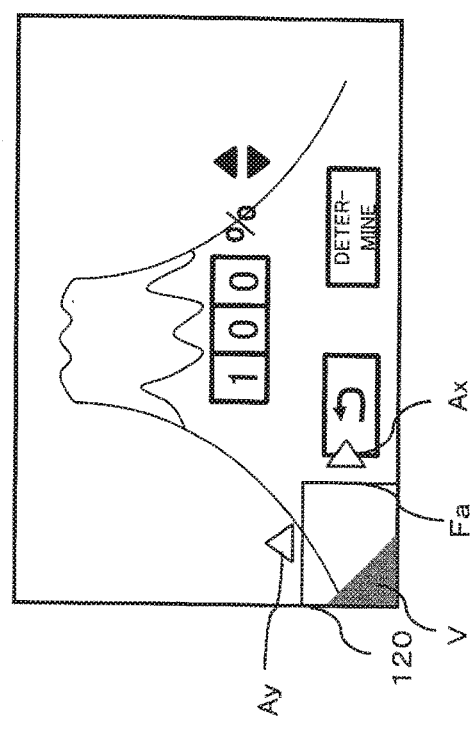
Figure 10A:
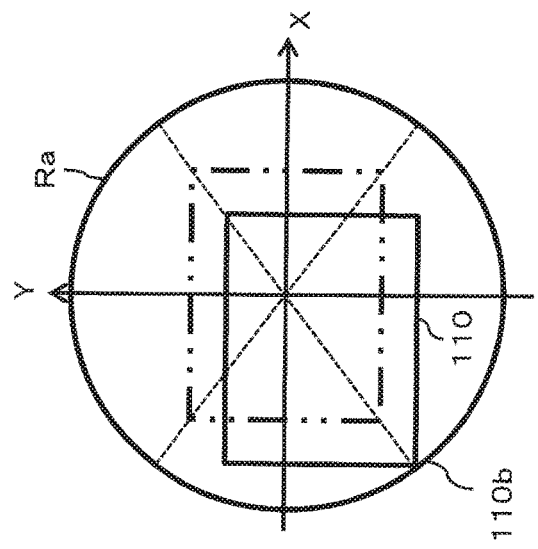
FIGS. 10A to 10D are views illustrating movement control of the imaging sensor according to a movement of the gaze frame.
Figure 10B:
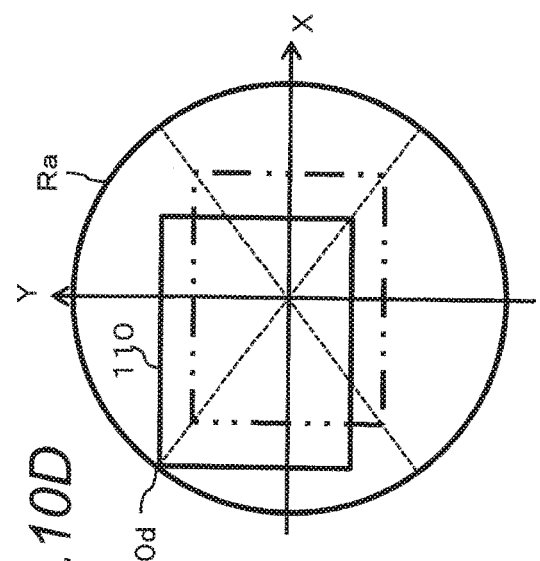
Figure 10C:
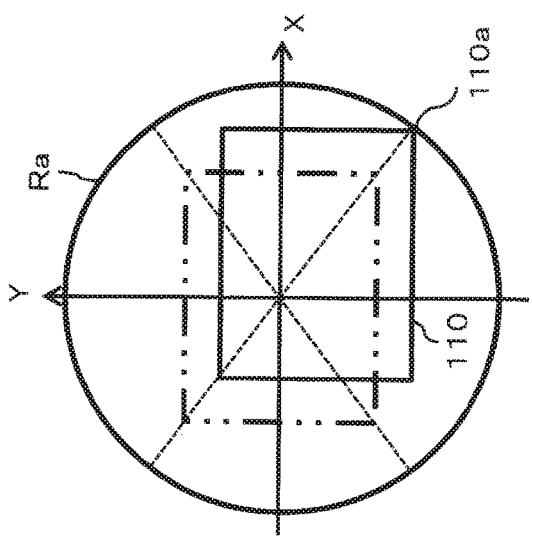
Figure 10D:
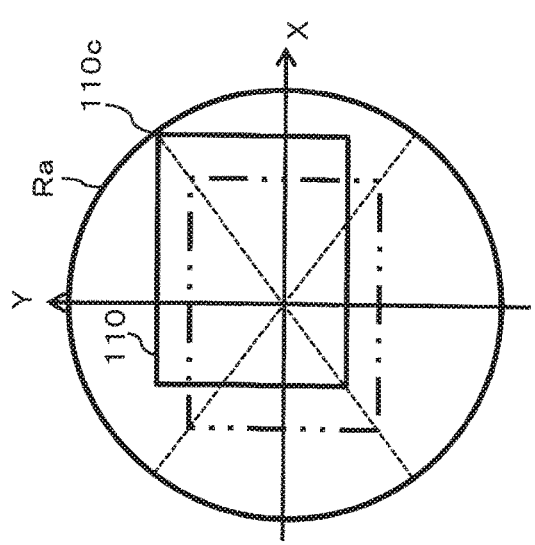

FIGS. 10A to 10D are views illustrating movement control of the imaging sensor 110 according to a movement of the gaze frame Fa. This control will be described with FIGS. 9A to 9D corresponding to FIGS. 10A to 10D. For example, as shown in FIG. 9A, when the gaze frame Fa is moved to (when positioned at) the upper left corner in the correction range setting screen, the camera controller 140 moves the imaging sensor 110 maximally to the lower right in the diagonal direction, to a position where the lower right corner 110a of the imaging sensor 110 comes into contact with an outer circumference of the limited movable range Ra, as shown in FIG. 10A. Note that the imaging sensor 110 is moved in the opposite direction to the moving direction of the gaze frame Fa because the up, down, left, and right of the object image formed through the interchangeable lens are inverted with respect to the real object in the imaging sensor 110. As shown in FIG. 9B, when the gaze frame Fa is moved to the upper right corner in the correction range setting screen, the camera controller 140 moves the imaging sensor 110 maximally to the lower left in the diagonal direction, to a position where a lower left corner 110b of the imaging sensor 110 comes into contact with the outer circumference of the limited movable range Ra, as shown in FIG. 10B. As shown in FIG. 9C, when the gaze frame Fa is moved to the lower left corner in the correction range setting screen, the camera controller 140 moves the imaging sensor 110 maximally to the upper right in the diagonal direction, to a position where an upper right corner 110c of the imaging sensor 110 comes into contact with the outer circumference of the limited movable range Ra, as shown in FIG. 10C. As shown in FIG. 9D, when the gaze frame Fa is moved to the lower right corner in the correction range setting screen, the camera controller 140 moves the imaging sensor 110 maximally to the upper left in the diagonal direction, to a position where an upper left corner 110d of the imaging sensor 110 comes into contact with the outer circumference of the limited movable range Ra, as shown in FIG. 10D. Hereinafter, movement positions of the imaging sensor 110 at the time when the imaging sensor 110 is moved toward the upper left, the upper right, the lower right, and the lower left in this way are appropriately referred to as an upper left maximum movement position (upper left corner position), an upper right maximum movement position (upper right corner position), a lower right maximum movement position (lower right corner position), and a lower left maximum movement position (lower left corner position).

The reason why the imaging sensor 110 is configured to be able to move to the upper left maximum movement position, the upper right maximum movement position, the lower right maximum movement position, and the lower left maximum movement position is as follows. For example, there is a case where a position of the optical axis is shifted due to aging deterioration and the like in an interchangeable lens such as an old lens. In this case, the optical axis of the interchangeable lens does not coincide with a center of the imaging sensor at the sensor reference position, and a center of the image circle is eccentric with respect to the center of the imaging sensor. As a result, a degree of occurrence of vignetting when the imaging sensor is moved to the above four maximum movement positions may differ between these maximum movement positions. Further, there is a case where a center of the movable range of the imaging sensor is shifted from an original position due to aging deterioration and the like of mechanical components of the sensor driver 181. Also in this case, the center of the imaging sensor at the sensor reference position and the center of the image circle are eccentric without being coincide with each other. As a result, a degree of occurrence of vignetting may differ between these maximum movement positions. According to the present embodiment, even when these situations occur, it is possible to check whether or not vignetting occurs at all the maximum movement positions in accordance with the user's intention.

According to such a configuration, the user can move the imaging sensor 110 by operating the joystick 131 to move the position of the gaze frame Fa, to any position among the upper left maximum movement position, the upper right maximum movement position, the lower right maximum movement position, and the lower left maximum movement position within the current limited movable range Ra, to check presence or absence of vignetting. Note that the user is not required to move the gaze frame Fa to all of these four corners but may simply move the gaze frame Fa exclusively to any one to three corners considered to require to check presence or absence of vignetting.

2.3 Shake Correction Process in Digital Camera

A shake correction process in the digital camera 1 of the present embodiment will be described with reference to a flowchart of FIG. 11. In the digital camera 1, as described above, image blur on the imaging sensor 110 due to camera shake is canceled by driving the imaging sensor 110 based on a detected shake amount. At that time, when a size (radius) of a drive range of the imaging sensor 110 calculated based on the detected shake amount is larger than a size (radius) of the limited movable range Ra, a movement amount of the imaging sensor 110 is limited so that the imaging sensor 110 does not move beyond the limited movable range Ra.

Figure 11:
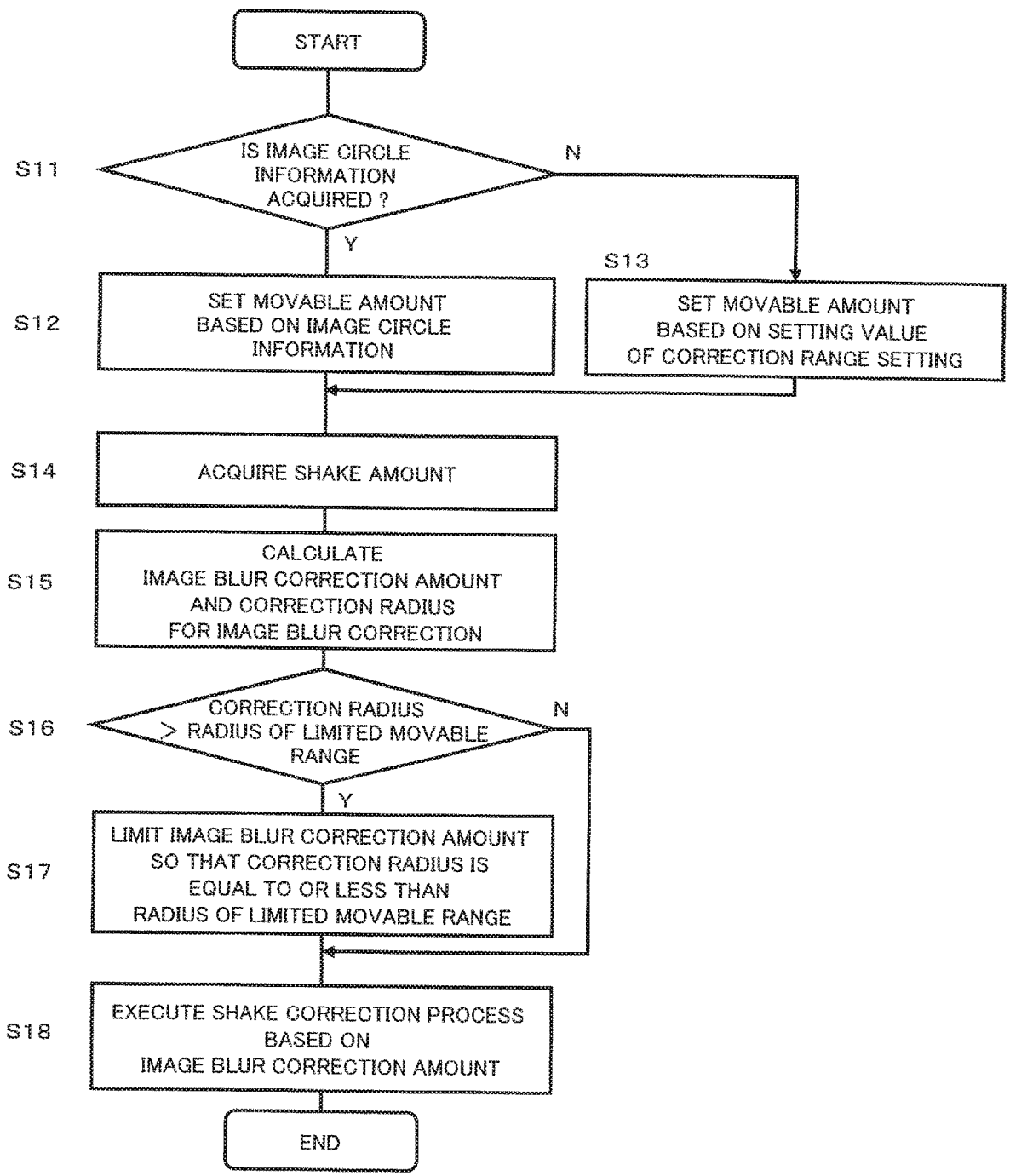
FIG. 11 is a flowchart illustrating a shake correction process.

FIG. 11 is a flowchart regarding the shake correction process in the digital camera 1. This process is executed when the user presses a release button (instructs capturing).

The camera controller 140 determines whether or not image circle information of the interchangeable lens is acquired (S11).

When the image circle information of the interchangeable lens is acquired (YES in S11), the camera controller 140 sets a size (radius) of the limited movable range Ra based on the acquired image circle information (S12).

Whereas, when the image circle information of the interchangeable lens is not acquired (NO in S11), the camera controller 140 sets a size (radius) of the limited movable range Ra based on a movable amount limitation rate that is set on the correction range setting screen (S13). As will be described later, when the correction range is set for a plurality of interchangeable lenses (old lenses), a movable amount limitation rate for the interchangeable lens selected most recently is used. Further, as described later, the camera controller 140 may display a screen that allows the user to select an interchangeable lens desired to be used and use the movable amount limitation rate for the interchangeable lens selected on the screen.

The camera controller 140 acquires a shake amount (output of the integrator 408) from the BIS processor 183 (S14), and calculates an image blur correction amount (sensor movement amount) of the imaging sensor 110 required to cancel image blur on the imaging surface, based on the acquired shake amount (S15). Specifically, the camera controller 140 calculates a distance (correction radius) from a center position of the imaging sensor 110 at the time when the BIS function is not activated (when the imaging sensor 110 is at the sensor reference position), to a corner on a moving direction side of the imaging sensor 110 at the time when the BIS is activated and the imaging sensor 110 is moved by the image blur correction amount. For example, when it is necessary to move the imaging sensor 110 in the diagonal direction by an image blur correction amount a in order to cancel image blur, the distance (correction radius) is a diagonal length of the imaging sensor+α.

The camera controller 140 compares the correction radius with the radius of the limited movable range Ra, to determine whether or not the correction radius is larger than the radius of the limited movable range Ra (S16).

When the correction radius is larger than the radius of the limited movable range Ra (YES in S16), the camera controller 140 limits (reduces) the image blur correction amount so that the correction radius is equal to or less than the radius of the limited movable range Ra (S17).

On the other hand, when the correction radius is equal to or smaller than the radius of the limited movable range Ra (NO in S16), the camera controller 140 executes the shake correction process based on the image blur correction amount calculated based on the shake amount detected in step S15 (S18).

2.4 Correction Range Setting

Figure 12:
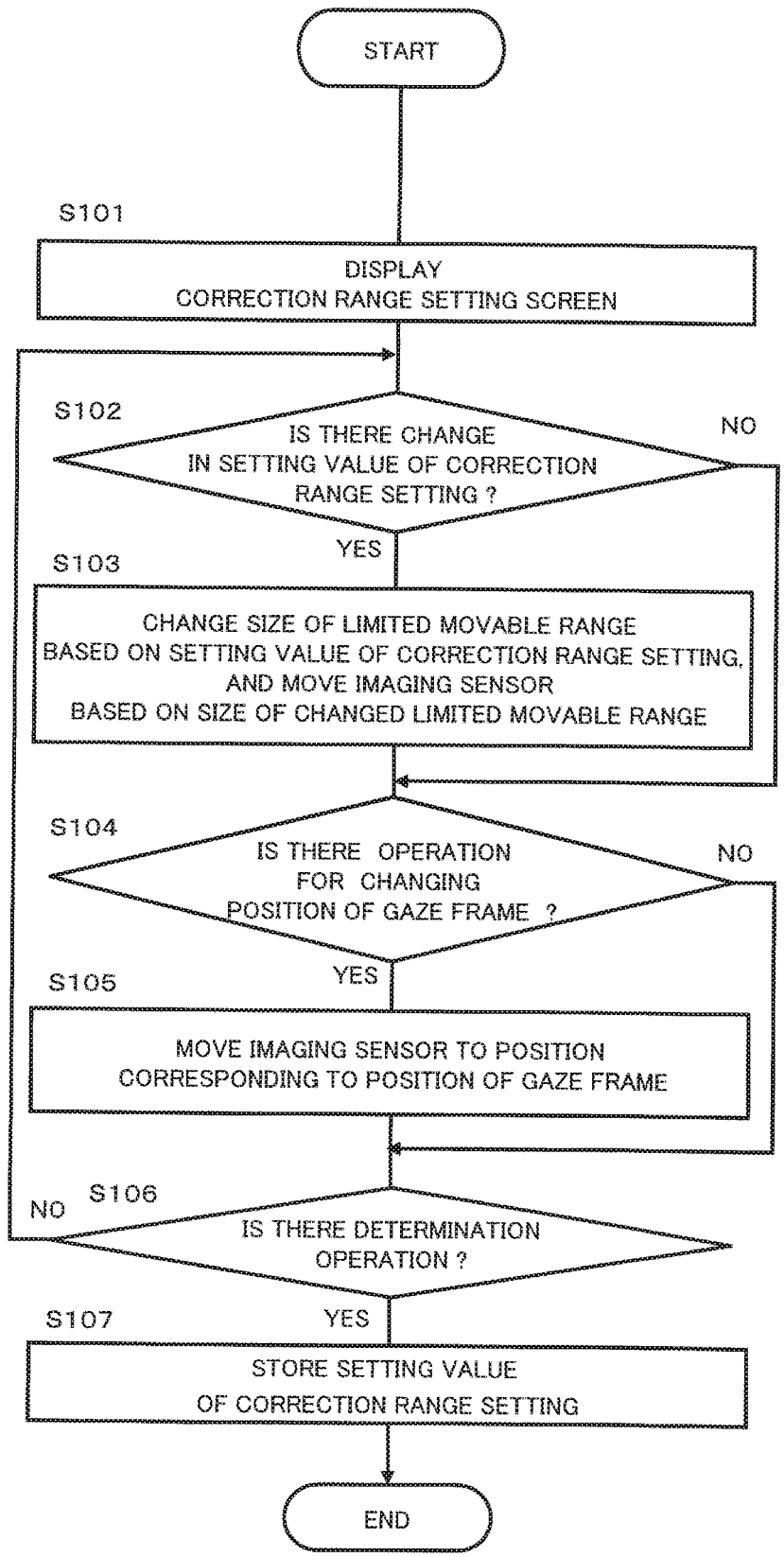
FIG. 12 is a flowchart illustrating a correction range setting process.

The above-described correction range setting process will be described with reference to a flowchart of FIG. 12 and explanatory views of FIGS. 13A to 13D and 14A to 14D. FIG. 12 is a flowchart showing the correction range setting process by the camera body 100. FIGS. 13A to 13D and 14A to 14D are views illustrating the correction range setting process. The correction range setting, as described with reference to FIG. 8, processing for setting (changing) a movable amount of the imaging sensor 110, to set (change) a movable range of the imaging sensor 110.

Figure 13A:
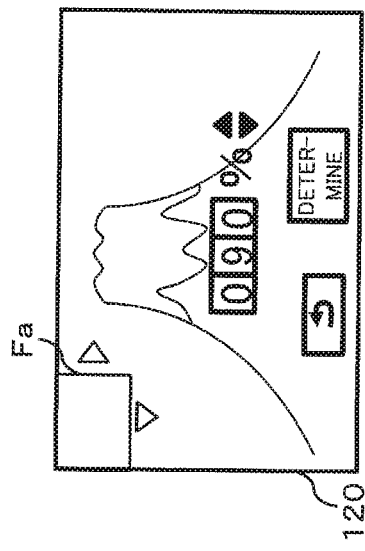
FIGS. 13A to 13D are views illustrating the correction range setting process.
Figure 13B:
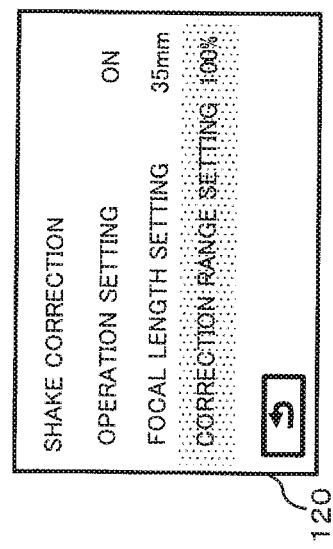

When the user performs settings related to shake correction for the attached interchangeable lens (old lens), the user performs a predetermined operation on the operation unit 130 to cause the touch display 120 to display the menu screen of FIG. 13A related to shake correction. The menu screen displays items such as "operation setting", "focal length setting", and "correction range setting" as setting items related to shake correction and displays a return button. When the "operation setting" is touched, it enables selection as to whether to turn "ON" or "OFF" the shake correction. FIG. 13A shows an example in which "ON" is selected. When "focal length setting" is touched, it enables the focal length of the interchangeable lens to be newly set or selected from a plurality of options. FIG. 13A shows an example in which "35 mm" is set. When "correction range setting" is touched, it enables setting of the above-described movable amount limitation rate. FIG. 13A shows an example in which "100%" is set as the movable amount limitation rate. When "correction range setting" is selected, the camera controller 140 displays a correction range setting screen on the touch display 120 (S101). FIG. 13B is a view illustrating an example of the correction range setting screen. FIG. 13B shows an example in which the same content as in FIG. 8 is displayed. Therefore, a specific description is omitted.

Figure 13C:
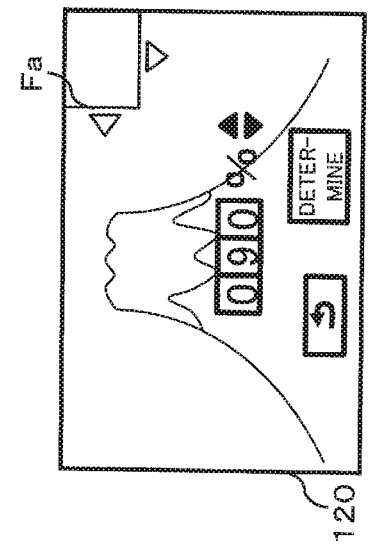
Figure 14A:
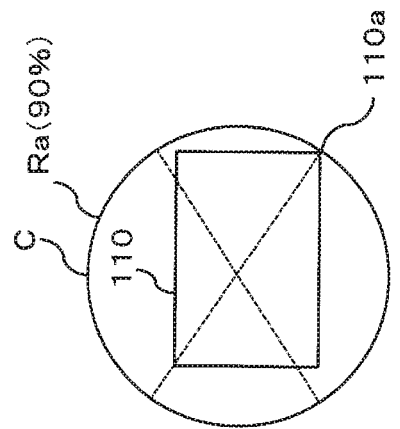
FIGS. 14A to 14D are views illustrating the correction range setting process.
Figure 14D:
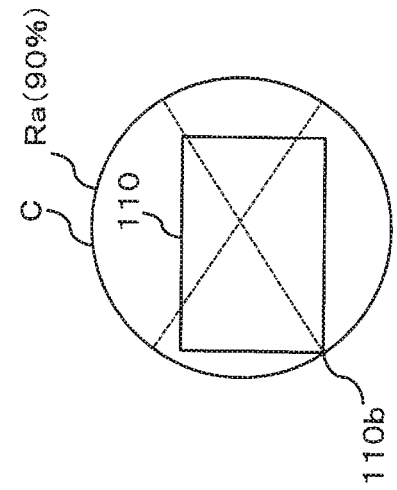
Figure 14B:
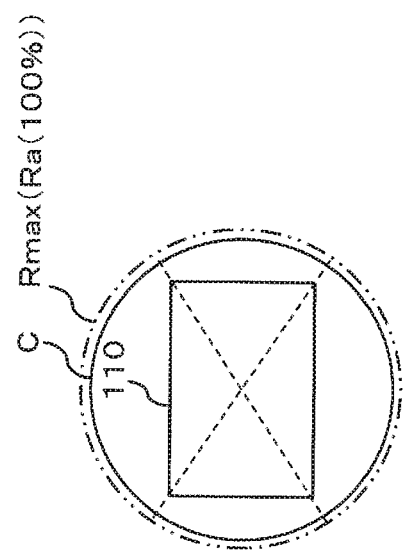

When displaying the correction range setting screen of FIG. 13B, the camera controller 140 moves the imaging sensor 110 being at the sensor reference position shown in FIG. 14A, maximally in a diagonal direction within the limited movable range Ra (maximum movable range Rmax) when the movable amount limitation rate is 100%, as shown in FIG. 14B. FIG. 14B shows an example in which the imaging sensor 110 is moved to the lower right to the maximum in the diagonal direction within the limited movable range Ra when the movable amount limitation rate is 100%. Further, FIG. 14B shows an example in which the size (radius) of the limited movable range Ra when the movable amount limitation rate is 100% is larger than the size (radius) of the image circle C. In this case, the lower right corner 110a of the imaging sensor 110 deviates out of the image circle C. Therefore, object light does not reach the vicinity of the lower right corner 110a of the imaging sensor 110 that deviates out of the image circle C, and vignetting V occurs in a portion of the sky at the upper left corner of the live view image, which is the background image of the correction range setting screen in FIG. 13B. The user can recognize that the vignetting V is to occur in the upper left corner of the captured image when the movable amount limitation rate is set to 100%, by viewing the image in the gaze frame Fa in the live view image. In addition, the user can recognize that the movable amount limitation rate is required to be changed to a value smaller than 100% in order not to cause vignetting V. Then, it is assumed that the user operates the operation unit 130 to change the movable amount limitation rate to 90% as shown in FIG. 13C.

The camera controller 140 determines whether or not there is a change in the setting value (movable amount limitation rate) on the correction range setting screen (S102). That is, it is determined whether or not the user changes the movable amount limitation rate on the correction range setting screen in FIG. 13B.

Figure 14C:
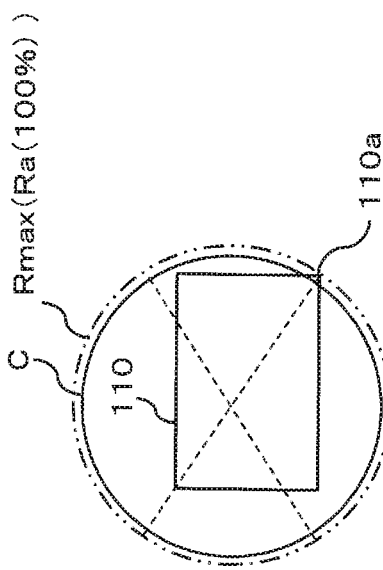

When it is determined that there is a change in the movable amount limitation rate (YES in S102), the camera controller 140 changes a size (radius ra) of the limited movable range Ra based on the changed movable amount limitation rate (S103). For example, when the movable amount limitation rate is changed to 90% by the user operation as shown in FIG. 13C, the camera controller 140 changes a size (radius ra) of the limited movable range Ra to a size (radius) corresponding to the movable amount limitation rate of 90%. Further, at this time, as shown in FIG. 14C, the camera controller 140 moves the imaging sensor 110 maximally to the lower right in the diagonal direction within the limited movable range Ra with the movable amount limitation rate of 90%. FIG. 14C shows an example in which the radius of the image circle C is equal to the radius of the limited movable range Ra with the movable amount limitation rate of 90%. In this case, the lower right corner 110a of the imaging sensor 110 is in contact with an outer periphery of the image circle C. Therefore, the entire region of the imaging sensor 110 is located in the image circle C, and object light reaches the entire region of the imaging sensor 110. Therefore, no vignetting occurs in the gaze frame Fa of the live view image on the correction range setting screen in FIG. 13C. Therefore, the user can recognize that no vignetting is to occur in the upper left corner of the captured image by setting the movable amount limitation rate to 90%.

When it is determined in step S102 that there is no change in the movable amount limitation rate (NO in S102), the camera controller 140 bypasses the processing of step S103.

The camera controller 140 determines whether or not there is an operation for changing a position of the gaze frame Fa (S104).

Figure 13D:
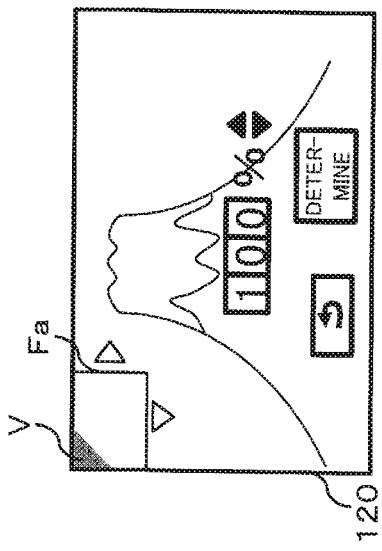

When it is determined that there is an operation for changing the position of the gaze frame Fa (YES in S104), the camera controller 140 moves the imaging sensor 110 to a position corresponding to the position of the gaze frame Fa (S105). For example, when the joystick 131 is tilted to the right by the user, the camera controller 140 moves the gaze frame Fa to a position of the upper right corner of the live view image on the correction range setting screen as shown in FIG. 13D, and moves the imaging sensor 110 maximally to the left in the limited movable range Ra with the movable amount limitation rate of 90% as shown in FIG. 14D. FIG. 14D shows an example in which the size (radius) of the image circle C is equal to the size (radius) within the limited movable range Ra with the movable amount limitation rate of 90%. In this case, the lower left corner 110b of the imaging sensor 110 is in contact with the outer periphery of the image circle C. Therefore, the entire region of the imaging sensor 110 is located in the image circle C, and object light reaches the entire region of the imaging sensor 110. Accordingly, no vignetting occurs in the gaze frame Fa of the live view image on the correction range setting screen in FIG. 13D. As a result, the user can recognize that no vignetting is to occur in the upper right corner of the captured image by setting the movable amount limitation rate to 90%.

On the other hand, when it is determined that there is no operation for changing the position of the gaze frame Fa (NO in S104), the camera controller 140 bypasses the processing of step S105.

The camera controller 140 determines whether or not a determination operation is performed by the user using the determination button (S106).

When it is determined that the determination operation is performed (YES in S106), the camera controller 140 stores the movable amount limitation rate set by the user into the flash memory 142 (S107) and ends the correction range setting process.

When it is determined in step S106 that the determination operation is not performed (NO in S106), the camera controller 140 returns to step S102 and executes the subsequent processing again.

2.5 Old Lens Selection Screen

The user may have a plurality of interchangeable lenses corresponding to the old lens. In consideration of this, the digital camera 1 of the present embodiment is configured such that a setting value of the correction range setting for a plurality of old lenses can be registered for each old lens, and the user can set a setting value of correction range setting of a desired old lens by simply selecting the desired old lens from the old lens selection screen. This will be described in detail below.

Figure 15A:
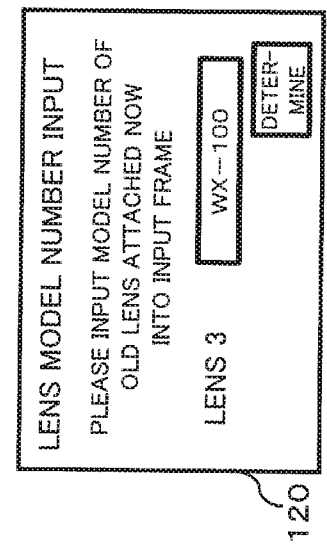
FIGS. 15A to 15C are views illustrating an old lens registration process.
Figure 15B:
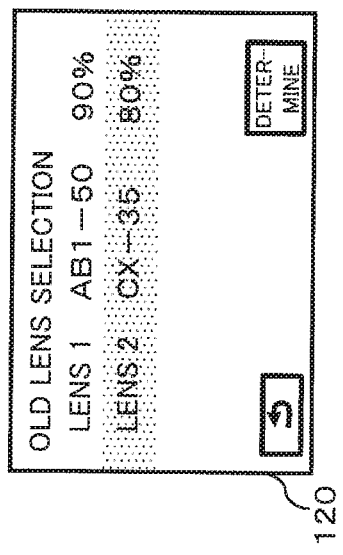
Figure 15C:
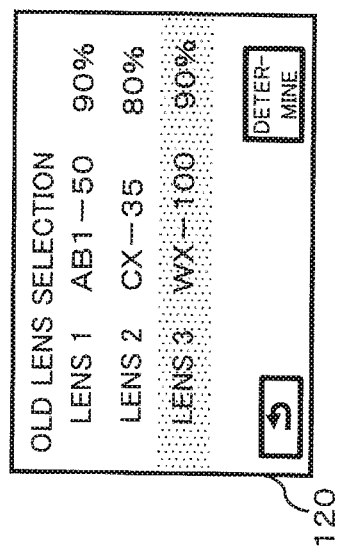

FIGS. 15A to 15C are views illustrating an old lens registration process according to another embodiment. FIG. 15A is a view showing an example of an old lens selection screen. The old lens selection screen can be called by performing a predetermined operation on the operation unit 130, for example. The old lens selection screen associates and displays a lens model number and a setting value of the correction range setting for each old lens. The lens model number is manually registered by the user as will be described later. FIG. 15A shows an example in which two old lenses, a lens 1 and a lens 2, are registered. As to the lens 1, "AB1-50" is registered as the lens model number, and "90%" is registered as the setting value of the correction range setting. Further, as to the lens 2, "CX-35" is registered as the lens model number, and "80%" is registered as the setting value of the correction range setting. A shading is overlaid on the lens 2, which indicates that the lens 2 is currently selected. When the user uses the determination button to perform a determination operation in this state, the selection of the lens 2 is confirmed, and "80%" is set, which is the setting value of the correction range setting set by the user. Touching the return button makes it possible to return to a main setting screen and the like. Although FIG. 15A shows a registration example of the lens model number, any lens name or the like desired by the user may be registered in a case of not externally communicating the setting value of the correction range setting, which is described in another embodiment.

An old lens can be newly registered on the old lens selection screen, for example, by the following method. For example, when it is determined in step S106 that the determination operation is performed, the camera controller 140 displays a lens model number input screen for accepting registration of a model number of the old lens by the user, as shown in FIG. 15B. When two old lenses, the lens 1 and the lens 2, are already registered as shown in FIG. 15A, the camera controller 140 displays an input frame for accepting an input of a lens model number of a lens 3, on the lens model number input screen shown in FIG. 15B. When the user performs a touch operation inside the input frame, for example, a keyboard is displayed, then the user can input characters. FIG. 15B shows an example in which the lens model number "WX-100" is inputted as the lens 3 by the user. When the user performs a determination operation using the determination button after the lens model number is inputted, the camera controller 140 stores, into the flash memory 142 in association with the lens 3, a setting value of the correction range setting (movable amount limitation rate) set by the user and the inputted lens model number, and ends the correction range setting process.

After the lens 3 is registered, when the old lens selection screen is called next, the camera controller 140 causes the old lens selection screen to display information on the lens 3 in addition to the lenses 1 and 2. This allows the user to easily set a correction range for the old lens of the lens 3 as well.

As described above, according to the present embodiment, when the user has a plurality of old lenses (interchangeable lenses), it becomes possible to easily set a setting value of the correction range setting according to the old lens to be used from the old lens selection screen, and causes the digital camera 1 to perform the BIS control according to the old lens to be used. This configuration can also provide the following effects. That is, even when the focal length is the same and the mount type is the same, a size (radius) of the image circle may be different due to a difference in the design concept of the old lens in a case that the lens model number is different. Even in such a case, this configuration allows the user to easily set an optimum correction range for each old lens by storing a setting value (movable amount limitation rate) of the correction range setting in association with the lens model number.

2.6 External Input/Output of Correction Range Setting Data

The digital camera 1 of the present embodiment has a function of externally inputting and outputting setting value data of correction range setting (hereinafter referred to as "correction range setting data" as appropriate) that is set as described above. Specifically, the digital camera 1 has a function of transmitting and receiving correction range setting data through the memory card 171 or the network, between with a third-party digital camera having a function similar to that of the digital camera 1 of the present embodiment. The memory card 171 may be any card such as an SD card or an XQD (registered trademark) card.

For example, in a case of through the memory card 171, when the user performs a predetermined operation, the camera controller 140 outputs correction range setting data of the old lens stored in the flash memory 142 to the memory card 171 in a predetermined list format. FIG. 16 is a view showing an example of a list of correction range setting data to be outputted. The list of correction range setting data associates and records a lens model number and a setting value of the correction range setting for each old lens. When the memory card 171 storing the list of FIG. 16 is inserted into the card slot 170 of the digital camera 1 possessed by a third party, and a predetermined user operation is performed, the camera controller 140 of the third-party digital camera 1 reads the correction range setting data recorded on the memory card 171, and records the correction range setting data into the flash memory 142. Thereafter, when a user operation for displaying the old lens selection screen is performed on the third-party digital camera 1, the camera controller 140 of the third-party digital camera 1 displays an old lens selection screen including the old lenses registered in the list of FIG. 16. When the correction range setting data for another old lens is registered earlier in the flash memory 142 of the third-party digital camera 1, an old lens selection screen is displayed in which both the old lens registered earlier and the old lens read from the flash memory 142 this time are displayed in the list. As described above, according to the digital camera 1 of the present embodiment, it is possible to use the correction range setting data for the setting value of the correction range setting that is set by another user between the plurality of digital cameras 1. Note that this example shows a case of through the memory card 171, but an external USB interface may be provided in the digital camera 1, and a USB memory connected to the external USB interface or the like may be used similarly to the SD card.

Figure 17:
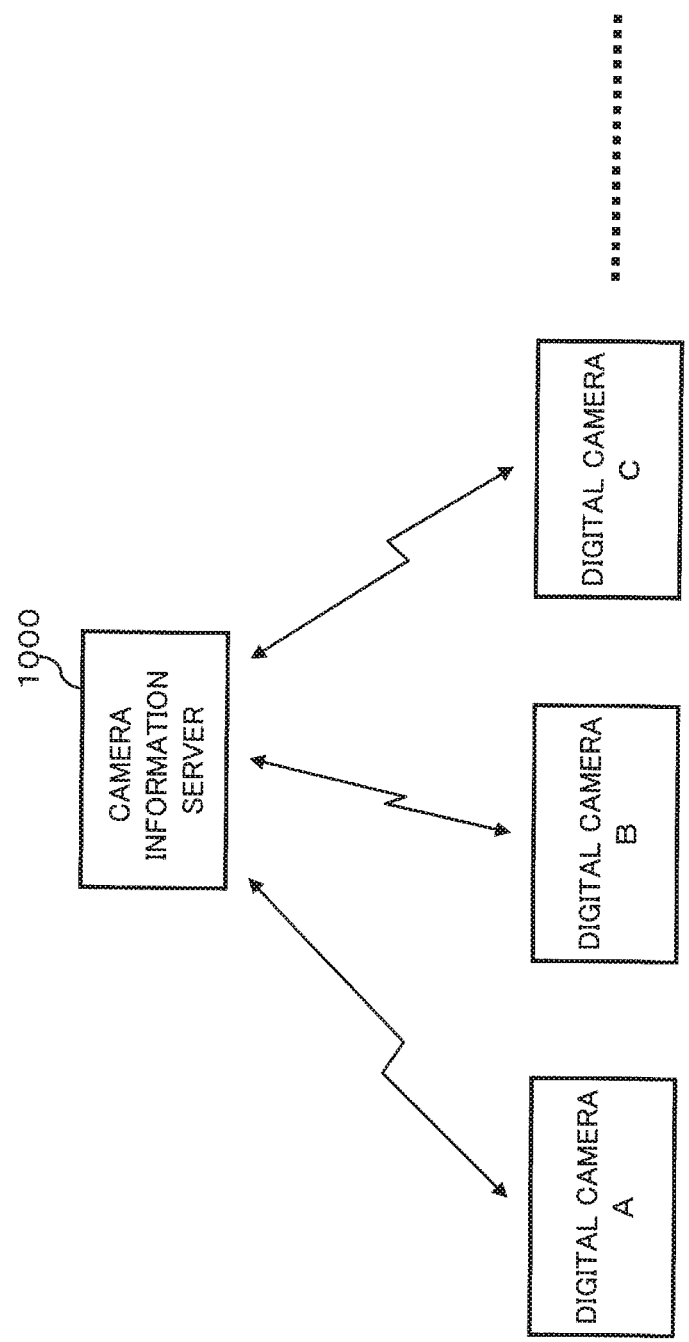
FIG. 17 is a configuration diagram of a system for providing correction range setting data through a network.

On the other hand, in a case of through a network, a configuration is as follows. FIG. 17 is a configuration diagram of a system for providing correction range setting data through a network. FIG. 18 is a view showing a configuration of a master data list for correction range setting data. The system for providing correction range setting data includes a camera information server 1000. The camera information server 1000 stores the master data list shown in FIG. 18. The master data list associates and records a lens model number and a setting value of the correction range setting for each old lens. The master data list is stored in the same format as the list of correction range setting data outputted to the memory card. Digital cameras A, B, C . . . have a network communication function and can upload the list of correction range setting data as shown in FIG. 16 to the camera information server 1000 through the network. When the list of correction range setting data is uploaded from any of the digital cameras A, B, C . . . , the camera information server 1000 fetches and stores the uploaded list of correction range setting data in the master data list. When one of the digital cameras A, B, C . . . requests for acquiring a master data list through the network, the camera information server 1000 transmits the master data list to the requesting digital camera. Such a providing system makes it possible to, when the user newly acquires the old lens, acquire and use the setting value of the correction range setting set by another user from the camera information server 1000 through the network. Note that, when the user downloads the master data list to the digital camera 1, the correction range setting data of the old lens required by the user may be exclusively selected and stored in the digital camera among the correction range setting data for the plurality of old lenses included in the master data list. Further, the camera information server 1000 may perform authentication so that a previously registered user who possesses the digital camera 1 can exclusively access. This can appropriately ensure the reliability of the correction range setting data.

3. Effects

As described above, the camera body 100 of the present embodiment (an example of an imaging apparatus) includes the imaging sensor 110 that captures an object image formed through an interchangeable lens, to generate image data, the sensor driver 181 (an example of a driver) that performs image blur correction by moving the imaging sensor 110 in a plane perpendicular to an optical axis, the touch display 120 (an example of an operation unit) that accepts a user operation for changing a movable amount of the imaging sensor 110 during image blur correction, and the camera controller 140 (an example of a controller) that causes the sensor driver 181 to move the imaging sensor 110 within a range of the changed movable amount.

This enables a movable amount of the imaging sensor 110 during image blur correction to be changed by a user operation. Therefore, the imaging sensor 110 can be driven within an image circle of the interchangeable lens. This can suppress occurrence of vignetting in the captured image.

The camera body 100 further includes the touch display 120 (an example of a display unit) that displays an image. The camera controller 140 displays a correction range setting screen (an example of a reception image) that accepts a user operation for changing a movable amount, and the operation unit is configured with a graphic user interface (GUI) that accepts a user operation based on the correction range setting screen. This allows the user to easily set the movable amount limitation rate by using the GUI.

The touch display 120 accepts an input of a movable amount limitation rate (an example of a numerical value related to a movable amount). This allows the user to quantitatively specify the limited movable range Ra with a numerical value indicating the movable amount limitation rate.

The camera body 100 further includes the touch display 120 (an example of a display unit) that displays an image. When a user operation for changing a movable amount on the touch display 120 is performed, the camera controller 140 causes the sensor driver 181 to move the imaging sensor 110 maximally with the changed movable amount with the sensor reference position as a reference, and causes the touch display 120 to display a live view image indicated by image data generated by the imaging sensor 110 at the position moved maximally. This allows the user to easily recognize the presence or absence of vignetting at the movement position by viewing the live view image.

The camera controller 140 causes the sensor driver 181 to move the imaging sensor 110 maximally in the diagonal direction of the imaging sensor 110 with the changed movable amount with the sensor reference position as a reference. This allows the user to view the live view image at the position where the imaging sensor 110 is moved in the diagonal direction. Since vignetting is likely to occur when the imaging sensor 110 is moved in the diagonal direction, the user can appropriately recognize the presence or absence of vignetting.

The camera controller 140 causes the sensor driver 181 to move the imaging sensor 110 maximally in the diagonal direction of the imaging sensor 110 with the changed movable amount with the sensor reference position as a reference, toward at least one of the upper right, the upper left, the lower right, or the lower left, then, for each movement, the camera controller 140 causes the touch display 120 to display a live view image indicated by image data generated by the imaging sensor 110, at the position moved maximally. This allows the user to more appropriately recognize the presence or absence of vignetting. An occurrence state of vignetting may vary from corner to corner of the imaging sensor 110 due to optical axis misalignment of the interchangeable lens and the like. However, the presence or absence of vignetting in such a case can be appropriately checked at one or more locations. Therefore, the presence or absence of vignetting can be recognized more appropriately.

The camera body 100 further includes the joystick 131 (an example of a second operation unit) that accepts a specifying operation for a position for moving the imaging sensor 110. The camera controller 140 causes the sensor driver 181 to move the imaging sensor 110 to a specified position when a specifying operation is performed with the joystick 131, and causes the touch display 120 to display a live view image indicated by image data generated by the imaging sensor 110 at the moved position. This allows the user to move the imaging sensor 110 to a desired position and view the live view image at the movement position. Therefore, the user can more appropriately recognize the presence or absence of vignetting.

The camera controller 140 causes the touch display 120 to display the gaze frame Fa indicating a region at which the user should gaze regarding occurrence of vignetting with the frame overlaid on the live view image. This allows the user to easily recognize the region to be gazed by the user regarding occurrence of vignetting. Therefore, it is possible to suppress that the user overlooks occurrence of vignetting.

Second Embodiment

Figure 19A:
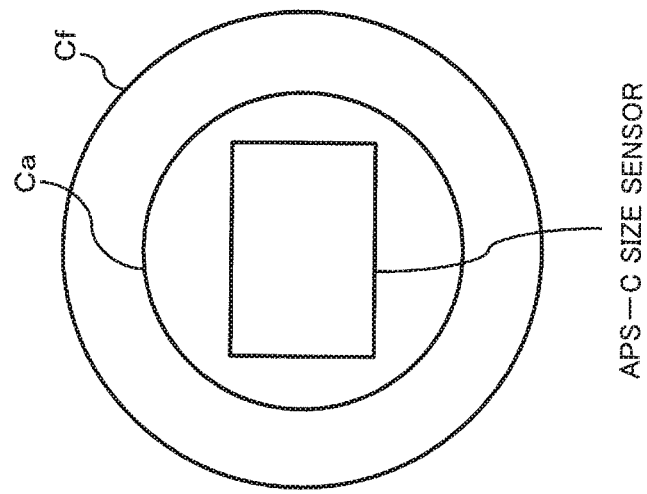
FIGS. 19A and 19B are views illustrating a lens type setting process in a second embodiment.
Figure 19B:
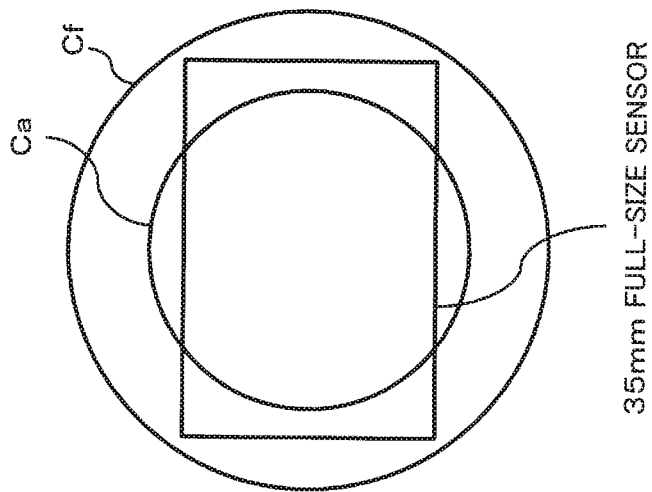

A second embodiment will be described below. There is a case where a camera body 100 is attached with an interchangeable lens (old lens) for an imaging sensor having a size different from that of an imaging sensor 110 provided in the camera body 100. A size of an image circle of the interchangeable lens varies depending on an imaging sensor size. For example, as shown in FIG. 19A, an image circle Cf of an interchangeable lens for a 35 mm full-frame sensor has a size optimized to cover the entire imaging surface of the 35 mm full-frame sensor. Further, as shown in FIG. 19B, an image circle Ca of an interchangeable lens for an APS-C size sensor has a size optimized to cover the entire imaging surface of the APS-C size sensor. Therefore, the image circle Cf of the interchangeable lens for the 35 mm full-frame sensor is larger than the image circle Ca of the interchangeable lens for the APS-C size sensor. Consequently, when the interchangeable lens for the APS-C size sensor is attached to a camera body equipped with the 35 mm full-frame sensor, the image circle Ca is not able to cover the 35 mm full-frame sensor as shown in FIG. 19A. On the other hand, when the interchangeable lens for the 35 mm full-frame sensor is attached to the camera body equipped with the APS-C size sensor, the image circle Cf can sufficiently cover the APS-C size sensor as shown in FIG. 19B. In consideration of such a case, a digital camera of the present embodiment is configured such that a size of a limited movable range Ra is changeable based on a sensor size to which the interchangeable lens attached to the camera body 100 is adapted, that is, in accordance with the lens type based on the sensor size. Note that a hardware configuration and a basic operation of the camera body 100 of the present embodiment are similar to those of the first embodiment, and a description thereof will be omitted.

Figure 20:
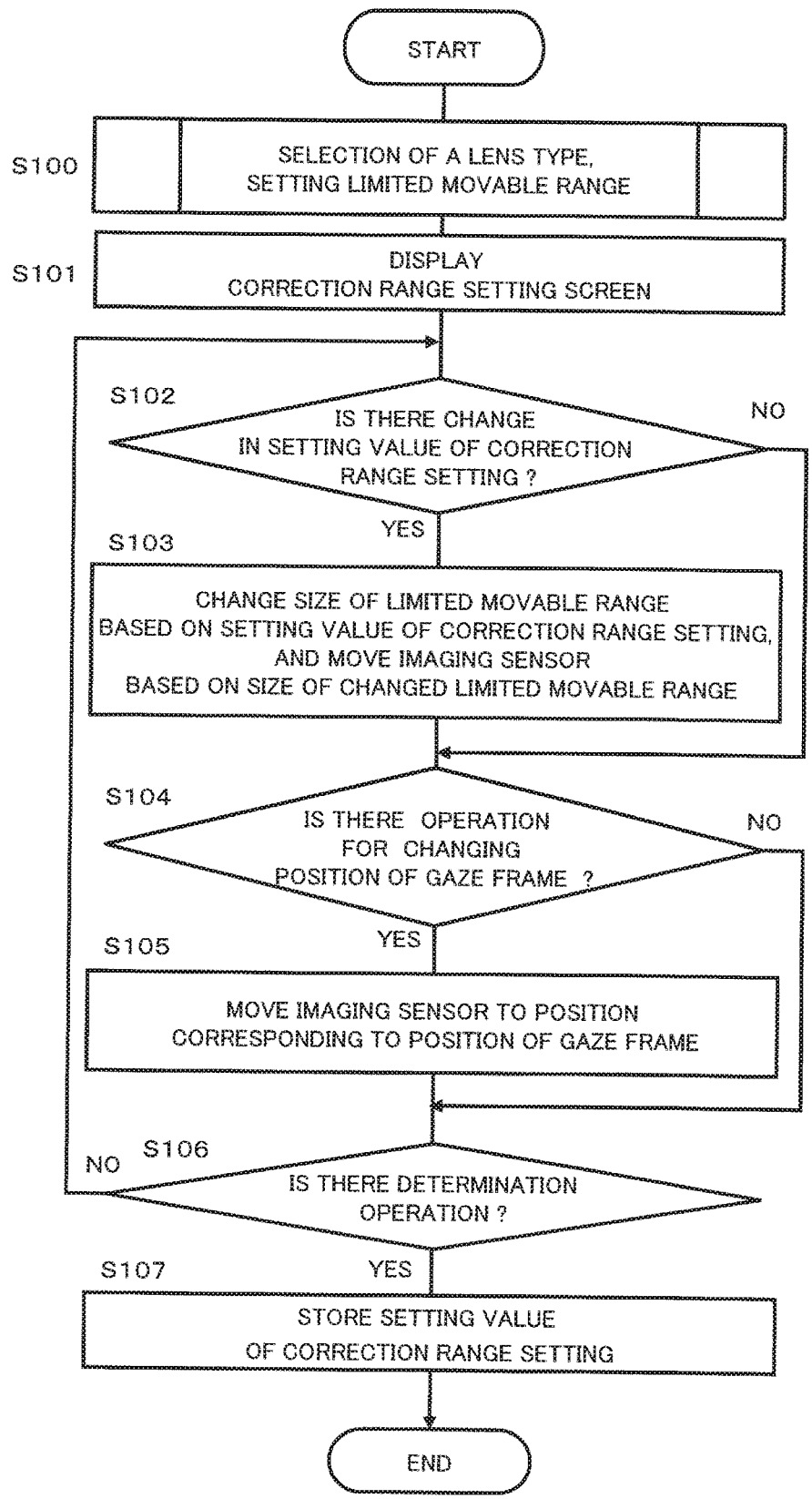
FIG. 20 is a flowchart illustrating the correction range setting process.

FIG. 20 is a flowchart showing a setting process of the limited movable range Ra according to the present embodiment. A camera controller 140 of the present embodiment performs the processing of step S100 in addition to the processing of steps S101 to S107 in FIG. 12.

Figure 21:
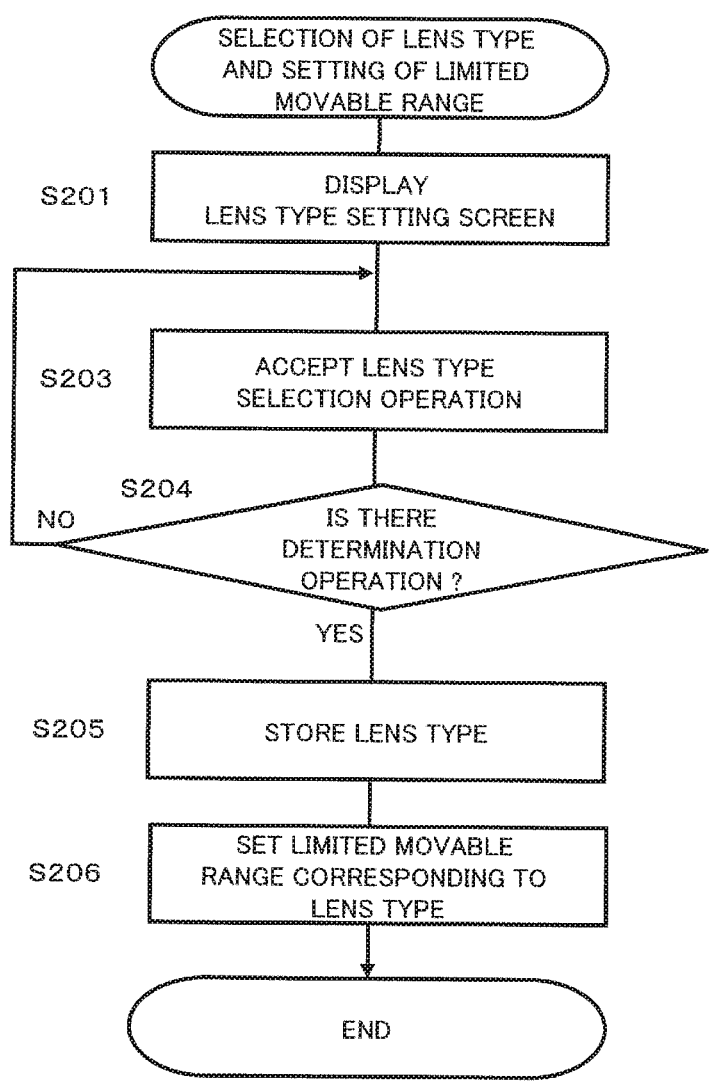
FIG. 21 is a flowchart illustrating the lens type setting process.

Specifically, the camera controller 140 accepts selection of a lens type by a user before performing the processing of step S101 and performs processing for setting the limited movable range Ra of a size according to the selected lens type (S100). FIG. 21 is a flowchart specifically showing the processing of step S100 of FIG. 20. FIGS. 22A to 22D are views illustrating the processing of step S100 of FIG. 20.

When "lens type setting" is selected from a plurality of setting items on a shake correction menu screen of FIG. 22A, the camera controller 140 displays a lens type setting screen as shown in FIG. 22B on a touch display 120 (S201). FIG. 22B is a view showing an example of the lens type setting screen. The lens type setting screen of FIG. 22B displays "F35 mm" and "APS-C" as selectable lens types. In addition, a shading is overlaid on "F35 mm", which indicates that "F35 mm" is currently selected.

The camera controller 140 accepts a lens type selection operation by the user (S203). For example, when "APS-C" is selected by the user, a shading is overlaid, which indicates that "APS-C" is selected, as shown in FIG. 22C.

The camera controller 140 determines whether or not a determination operation is performed by the user using the determination button (S204).

When it is determined that the determination operation has not been performed (NO in S204), the camera controller 140 executes the processing of step S202 and the subsequent processing again.

When it is determined that the determination operation is performed (YES in S204), the camera controller 140 stores the currently selected lens type into the flash memory 142 as the lens type (S205). Further, the camera controller 140 displays a menu screen of FIG. 22D. In the menu screen of FIG. 22D, "APS-C" is displayed, which is the lens type selected on the lens type setting screen of FIG. 22C, and a shading is overlaid.

The camera controller 140 sets the limited movable range Ra corresponding to the lens type selected on the lens type setting screen (S206). In a case where the imaging sensor 110 of the camera body 100 of the present embodiment is the APS-C size sensor, when "F35 mm" is set as the lens type as shown in FIG. 22A, the camera controller 140 sets the limited movable range Ra according to the size of the image circle Cf of the 35 mm full-frame sensor in FIG. 19B. On the other hand, when "APS-C" is set as the lens type as shown in FIG. 22D, the camera controller 140 sets the limited movable range Ra according to the size of the image circle Ca of the APS-C size sensor.

When the processing based on the flowchart of FIG. 21 is ended, the camera controller 140 performs processing similar to that in the first embodiment in steps S101 to S107. Note that, in the present embodiment, the size of the limited movable range Ra determined in step S100 is used as the size of the limited movable range Ra when the movable amount limitation rate is 100%, and the limited movable range Ra is narrowed in accordance with a set movable amount limitation rate when the movable amount limitation rate is set to a value of 100% or less in the correction range setting. Note that, when "F35 mm" is set in the camera body equipped with the APS-C size sensor, the limited movable range Ra is to be larger than the mechanical maximum movable range Rmax by the sensor driver 181. In this case, the imaging sensor 110 is to be driven substantially within the maximum movable range Rmax due to mechanical limitation of the maximum movable range by the sensor driver 181.

As described above, the camera body 100 of the present embodiment further includes the touch display 120 (an example of a third operation unit) that accepts a setting operation of the imaging sensor size to which the interchangeable lens is adapted. When a setting operation is performed on the touch display 120, the camera controller 140 automatically sets the limited movable range Ra of a size corresponding to the imaging sensor size. This allows the user to easily set the limited movable range Ra having a size corresponding to the imaging sensor size to which the interchangeable lens to be attached is adapted.

Other Embodiments

The idea of the embodiments above is not limited to the embodiments described above. Various embodiments may be considered. Hereinafter, other embodiments to which the idea of the embodiments above can be applied will be described.

Each of the above-described embodiments shows an example of suppressing vignetting that may occur when the interchangeable lens alone is attached to the camera body 100. However, the present disclosure can exhibit similar effects in other cases as well. For example, when a hood or filter is attached to a tip of the interchangeable lens, the hood or the filter may enter the image circle of the interchangeable lens, and the image circle of the interchangeable lens may be substantially narrow. However, the camera body 100 is not able to recognize that the hood or the filter is attached to the interchangeable lens. Further, also when an interchangeable lens is attached to the camera body 100 via a tele conversion lens or a wide conversion lens, the image circle of the interchangeable lens may be substantially narrowed under an influence of an optical system of these conversion lenses. In this case, since the conversion lens is interposed between the interchangeable lens and the camera body 100, the camera body 100 is not able to communicate with the interchangeable lens and not able to acquire image circle information of the interchangeable lens. However, also in these cases, the present embodiment allows a movable amount of the imaging sensor 110 to be appropriately reduced by a user selecting correction range setting from the menu screen and checking the presence or absence of vignetting on the correction range setting screen. Therefore, it is possible to suppress occurrence of vignetting when the imaging sensor 110 is driven for shake correction.

In the above embodiment, the camera controller 140 displays the correction range setting screen on the touch display 120 when the user selects "correction range setting" on the menu screen, but the display timing of the correction range setting screen is not limited to this. For example, the camera controller 140 may automatically display the correction range setting screen on the touch display 120, when communication with the interchangeable lens is not possible even if the power of the camera body 100 is turned on by a user operation. Further, the camera controller 140 may automatically display the correction range setting screen on the touch display 120, when communication with the interchangeable lens is possible but it is not possible to acquire image circle information of the interchangeable lens from the interchangeable lens. Moreover, when the camera body 100 can communicate with the interchangeable lens and acquire image circle information through communication with the interchangeable lens, the camera controller 140 may not display the correction range setting item on the menu screen, or may gray out the correction range setting item. Further, even though the camera body 100 can communicate with the interchangeable lens and acquire image circle information through communication with the interchangeable lens, when the movable amount limitation rate is changed from "100%" to another value by the user, this may be ignored, and the BIS control at the movable amount limitation rate of 100% may be performed. Alternatively, the camera controller 140 may inhibit the user from changing a value to another value or may display a message indicating that the user is not allowed to change the value on the touch display 120.

The second embodiment shows an example in which one of the 35 mm full-frame sensor lens and the APS-C size sensor lens is selected as the lens type on the lens type setting screen. However, the present disclosure is not limited to this. For example, in addition to these lenses, lenses for imaging sensors of other sizes such as a Super 35 sensor lens, an MFTS size sensor lens, and an APS-H size sensor lens may be included.

Each of the above embodiments shows a configuration in which the imaging sensor 110 can be moved to the upper left maximum movement position (upper left corner position), the upper right maximum movement position (upper right corner position), the lower right maximum movement position (lower right corner position), and the lower left upper movement position (lower left corner position) in the diagonal direction, in accordance with a user operation on the joystick 131. However, in the present disclosure, the imaging sensor can be exclusively moved to one to three predetermined or any given maximum movement positions (corners) among the upper left maximum movement position, the upper right maximum movement position, the lower right maximum movement position, and the lower left maximum movement position in the diagonal direction. This is because occurrence of vignetting can be recognized to some extent by moving the imaging sensor 110 to at least one maximum movement position. Note that the imaging sensor 110 can be moved to any position between the upper left maximum movement position, the upper right maximum movement position, the lower right maximum movement position, and the lower left maximum movement position in accordance with an operation amount on the joystick 131 (for example, a duration of the tilting operation by the user).

Figure 24:
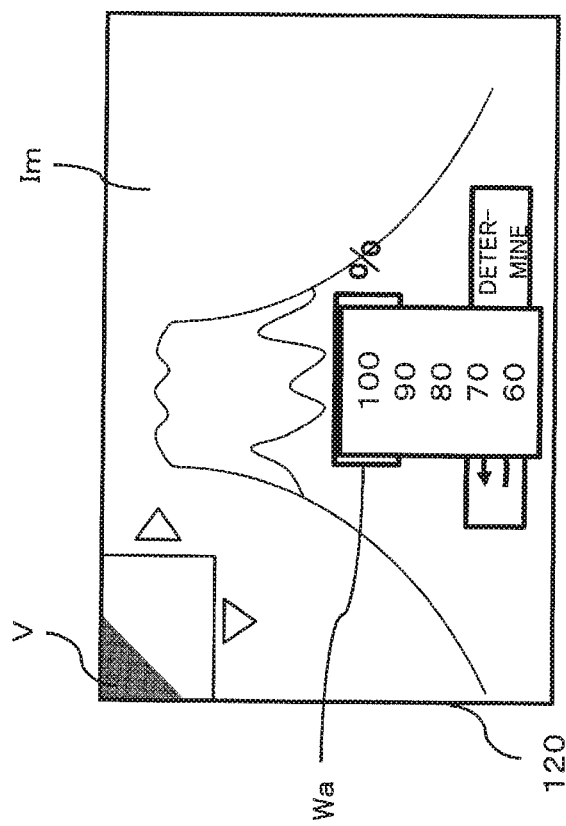
FIG. 24 is a view showing an example of a correction range setting screen in another embodiment.

The above embodiment shows an example in which the setting value in the numerical window Wa is changed when the user touches the upward cursor Za or the downward cursor Zb on the correction range setting screen in FIG. 8. However, the present disclosure is not limited to this. For example, as shown in FIG. 24, a pull-down menu displaying a list of selectable setting values may be displayed when the user touches the numerical window Wa. FIG. 24 shows the above-mentioned "100%", "90%", "80%", "70%", and "60%" as selectable setting values. When any of the selection items is touched, the camera controller 140 changes the setting value of the correction range setting to a setting value corresponding to the selection item that is touched.

Each of the above-described embodiments exemplifies a numerical value indicating the movable amount limitation rate such as "100%" and "90%" as the numerical value related to the movable amount. However, the numerical value related to the movable amount may be a numerical value indicating a ratio of a diameter or the radius of the limited movable range Ra to a diameter or a radius of the movable range, rather than the movable amount limitation rate. Further, in the present disclosure, the movable amount may be set by a method other than numerical value input. For example, a slidable slider can be displayed on the correction range setting screen, and the movable amount limitation rate and the like according to the slid position may be set.

Figure 23A:
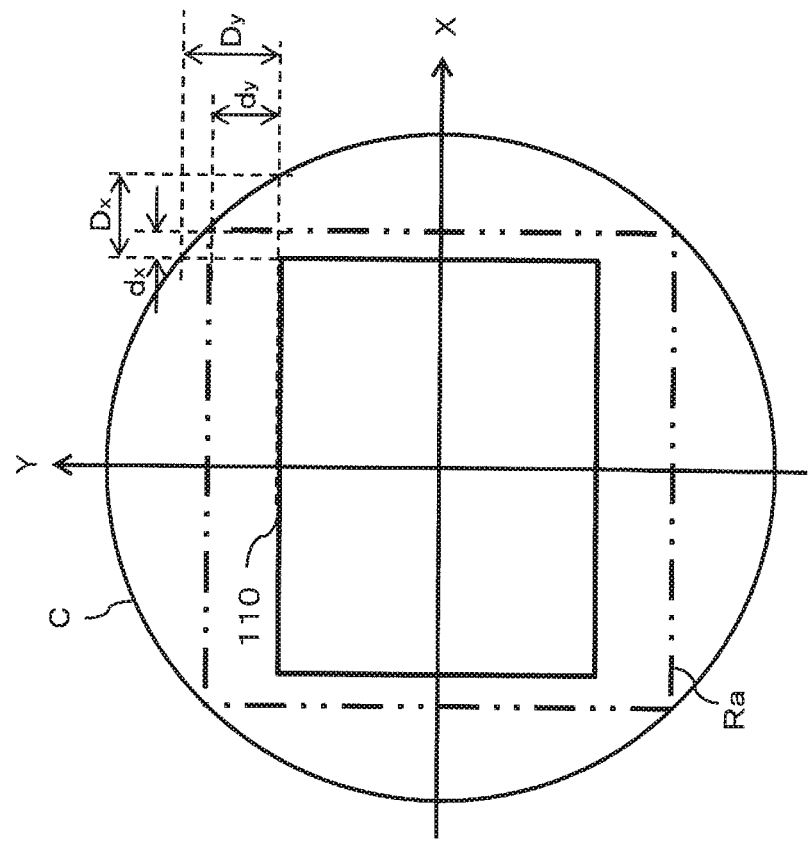
FIGS. 23A and 23B are views illustrating a correction range setting process in another embodiment.
Figure 23B:
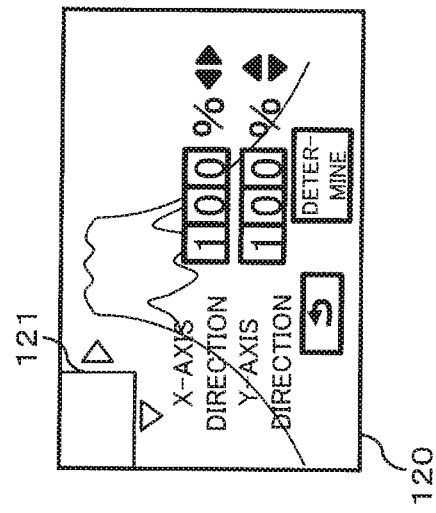

In the above embodiment, the screen shown in FIG. 8 is shown as the correction range setting screen, but the correction range setting screen is not limited to this in the present disclosure. FIGS. 23A and 23B are views illustrating correction range setting in another embodiment. Specifically, as shown in FIG. 23B, the limited movable range Ra can be set separately in an X-axis direction and a Y-axis direction. In this case, as shown in FIG. 23A, the limited movable range Ra is a rectangular region. Further, the limited movable range Ra in the X-axis direction is expressed as a ratio of a limited movable distance dx in the X-axis direction to a maximum movable distance Dx in the X-axis direction of the imaging sensor 110. The limited movable range Ra in the Y-axis direction is expressed as a ratio of a limited drive distance dy to a maximum movable distance Dy in the Y-axis direction of the imaging sensor 110. When setting is made in this way, the camera controller 140 moves the imaging sensor so that a corner in a moving direction of the imaging sensor is located at any given or a predetermined corner of the four corners of the rectangle limited movable range Ra, to display a live view image. This allows the user to determine whether or not vignetting is to occur in the captured image with these setting values. Such a configuration enables any given setting to be performed when it is desired to change the effects of shake correction in the X-axis direction and the Y-axis direction. This makes it possible to, for example, reduce the movable amount in the X direction while increasing the movable amount in the Y direction. This is because a gap amount in the Y direction is larger than that of the X direction with respect to the image circle C when the imaging sensor is at the sensor reference position.

Each of the above-described embodiments describes a case of capturing a still image, but the present disclosure can also be applied to a case of capturing a moving image.

As described above, the embodiments are described as an example of the technique in the present disclosure. For this purpose, the accompanying drawings and the detailed description are provided.

Accordingly, some of the constituent elements described in the accompanying drawings and the detailed description may also include constituent elements that are not indispensable for solving the problem in order to exemplify the above technique, in addition to indispensable constituent elements for solving the problem. Therefore, these constituent elements that are not indispensable are not to be immediately recognized to be indispensable on the basis of the fact that these constituent elements that are not indispensable are described in the accompanying drawings or the detailed description.

In addition, since the above-described preferred embodiment is intended to exemplify the technique in the present disclosure, it is possible to make various changes, replacements, additions, omissions, and the like within the scope of claims or the equivalent thereof.

(Present Disclosure)

The above embodiments disclose the following configuration.

(1) The imaging apparatus (1) includes:
an imaging sensor (110) that captures an object image formed through an interchangeable lens, to generate image data;
a driver (181) that performs image blur correction by moving the imaging sensor (110) in a plane perpendicular to an optical axis;
an operation unit (120) that accepts a user operation for changing a movable amount of the imaging sensor during image blur correction; and
a controller (140) that causes the driver to move the imaging sensor within a range of a changed movable amount.

(2) In (1), the imaging apparatus further includes a display unit (120) that displays an image. The controller causes the display unit to display a reception image for accepting a user operation for changing a movable amount. The operation unit is configured with a graphic user interface that accepts a user operation based on the reception image.

(3) In (1) or (2), the operation unit accepts an input of a numerical value related to a movable amount.

(4) In (1), the imaging apparatus further includes a display unit that displays an image. When a user operation for changing a movable amount on the operation unit is performed, the controller causes the driver to move the imaging sensor maximally with the changed movable amount with a sensor reference position as a reference, and causes the display unit to display a live view image indicated by image data generated by the imaging sensor at the position moved maximally.

(5) In (4), the controller may cause the driver to move the imaging sensor maximally in a diagonal direction of the imaging sensor with the changed movable amount with a sensor reference position as a reference.

(6) In (4), the controller may cause the driver to move the imaging sensor maximally in the diagonal direction of the imaging sensor with the changed movable amount with a sensor reference position as a reference, toward at least one of upper right, upper left, lower right, or lower left, and may cause, for each movement, the display unit to display a live view image indicated by image data generated by the imaging sensor at the position moved maximally.

(7) In (4), the imaging apparatus further includes a second operation unit (131) that accepts a specifying operation for a position for moving the imaging sensor. When a specifying operation is performed on the second operation unit, the controller causes the driver to move the imaging sensor to the specified position, and causes the display unit to display, at the moved position, a live view image indicated by image data generated by the imaging sensor.

(8) In any one of (4) to (7), the controller may cause the display unit to display a frame (Fa) indicating a region at which a user should gaze regarding occurrence of vignetting with the frame overlaid on the live view image.

(9) In (1), the imaging apparatus further includes a third operation unit (120) that accepts a setting operation for an imaging sensor size to which the interchangeable lens is adapted. The controller may automatically set the sensor movable range (Ra) of a size corresponding to an imaging sensor size, when a setting operation is performed on the third operation unit.

The idea of the present disclosure can be applied to an imaging apparatus (such as a digital camera, a camcorder, a mobile phone, and a smartphone) having an imaging function.

The invention claimed is:

1. An imaging apparatus comprising:
   an imaging sensor that captures an object image formed through an interchangeable lens, to generate image data;
   a driver that performs image blur correction by moving the imaging sensor in a plane perpendicular to an optical axis;
   an operation unit that accepts a user operation for changing a movable amount of the imaging sensor during image blur correction; and
   a controller that causes the driver to move the imaging sensor within a range of a changed movable amount.

2. The imaging apparatus according to claim 1, further comprising:
   a display unit that displays an image, wherein
   the controller causes the display unit to display a reception image for accepting a user operation for changing the movable amount, and
   the operation unit is configured with a graphic user interface that accepts a user operation based on the reception image.

3. The imaging apparatus according to claim 1, wherein the operation unit accepts an input of a numerical value related to the movable amount.

4. The imaging apparatus according to claim 1, further comprising:
   a display unit that displays an image, wherein
   the controller
   causes the driver to move the imaging sensor maximally with a changed movable amount with a sensor reference position as a reference, when a user operation for changing a movable amount on the operation unit is performed, and
   causes the display unit to display a live view image indicated by image data generated by the imaging sensor at a position moved maximally.

5. The imaging apparatus according to claim 4, wherein the controller causes the driver to move the imaging sensor maximally in a diagonal direction of imaging sensor with a changed movable amount with a sensor reference position as a reference.

6. The imaging apparatus according to claim 5, wherein the controller
   causes the driver to move the imaging sensor maximally in a diagonal direction of the imaging sensor with a changed movable amount with a sensor reference position as a reference, toward at least one of upper right, upper left, lower right, or lower left, and
   causes, for each movement, the display unit to display a live view image indicated by image data generated by the imaging sensor, at a position moved maximally.

7. The imaging apparatus according to claim 4, further comprising:
   a second operation unit that accepts specifying operation for a position for moving the imaging sensor, wherein
   the controller
   causes the driver to move the imaging sensor to a specified position when a specifying operation is performed on the second operation unit, and
   causes the display unit to display a live view image indicated by image data generated by the imaging sensor at a moved position.

8. The imaging apparatus according to claim 4, wherein the controller causes the display unit to display a frame indicating a region at which a user should gaze regarding occurrence of vignetting with the frame overlaid on the live view image.

9. The imaging apparatus according to claim 1, further comprising:
   a third operation unit that accepts a setting operation of an imaging sensor size to which an interchangeable lens is adapted, wherein
   the controller
   automatically sets a sensor movable range of a size corresponding to an imaging sensor size, when a setting operation is performed on the third operation unit.

* * * * *